US012238132B2

(12) United States Patent
Albanese et al.

(10) Patent No.: US 12,238,132 B2
(45) Date of Patent: Feb. 25, 2025

(54) METHOD AND SYSTEM FOR FACILITATING A RANKING SCORE USING ATTACK VOLUME TO FIND OPTIMAL CONFIGURATIONS

(71) Applicant: Palo Alto Research Center Incorporated, Palo Alto, CA (US)

(72) Inventors: Massimiliano Albanese, Potomac, MD (US); Ibifubara Iganibo, Fairfax, VA (US); Marc E. Mosko, Santa Cruz, CA (US); Alejandro E. Brito, Mountain View, CA (US)

(73) Assignee: Xerox Corporation, Norwalk, CT (US)

( * ) Notice: Subject to any disclaimer, the term of this patent is extended or adjusted under 35 U.S.C. 154(b) by 378 days.

(21) Appl. No.: 17/831,848

(22) Filed: Jun. 3, 2022

(65) Prior Publication Data

US 2023/0344855 A1  Oct. 26, 2023

Related U.S. Application Data

(60) Provisional application No. 63/334,032, filed on Apr. 22, 2022.

(51) Int. Cl.
*H04L 9/40* (2022.01)
*H04L 41/0816* (2022.01)

(52) U.S. Cl.
CPC ...... *H04L 63/1433* (2013.01); *H04L 41/0816* (2013.01); *H04L 63/1416* (2013.01); *H04L 63/1425* (2013.01); *H04L 63/1466* (2013.01)

(58) Field of Classification Search
CPC .............. H04L 63/14; H04L 63/1425; H04L 63/1433; H04L 63/1411; H04L 41/0816; H04L 63/1416; H04L 63/1466
See application file for complete search history.

(56) References Cited

U.S. PATENT DOCUMENTS 6,742,128 B1   5/2004 Joiner
6,952,779 B1 * 10/2005 Cohen ................. H04L 63/1433
                                                    726/22

(Continued)

FOREIGN PATENT DOCUMENTS

CN       106991325 A    7/2017
CN       106997437 A    8/2017

(Continued)

OTHER PUBLICATIONS

Albanese, M., & Jajodia, S. (2017). A Graphical Model to Assess the Impact of Multi-Step Attacks. The Journal of Defense Modeling and Simulation. 79-93.

(Continued)

*Primary Examiner* — Hosuk Song

(57) ABSTRACT

A system determines, in a graph which represents a system of components: vulnerability nodes representing known vulnerabilities to the system, including exposed and non-exposed vulnerability nodes associated with an exploitation likelihood; and dependency nodes representing components in the system, including direct and indirect dependency nodes associated with an exposure factor indicating an amount of degradation based on exploitation of an associated vulnerability. The system calculates, across all non-exposed vulnerability nodes and all direct dependency nodes, a score which indicates an attack volume based on at least: a respective second likelihood associated with a non-exposed vulnerability node; an exposure factor associated with a dependency node which represents a component directly degraded based on exploitation of a vulnerability; and a loss of utility of the component. The score is calculated for one or more configurations of the system, and the system selects an optimal configuration based on the calculated score.

20 Claims, 15 Drawing Sheets

(56) References Cited

U.S. PATENT DOCUMENTS

| | | | |
|---|---|---|---|
| 7,013,395 | B1 | 3/2006 | Swiler |
| 7,627,900 | B1 | 12/2009 | Noel |
| 9,215,158 | B1 | 12/2015 | Adogla |
| 9,317,692 | B2 | 4/2016 | Elder |
| 9,684,865 | B1 | 6/2017 | Ezick |
| 9,705,978 | B1 | 7/2017 | Kenigsberg |
| 9,736,173 | B2 | 8/2017 | Li |
| 9,979,750 | B2 * | 5/2018 | Wu ................. H04L 63/029 |
| 10,104,120 | B2 * | 10/2018 | Gopalakrishna .... H04L 63/1491 |
| 10,230,745 | B2 * | 3/2019 | Singh ................ H04L 63/1491 |
| 10,270,789 | B2 * | 4/2019 | Singh ................ H04L 63/1416 |
| 10,313,382 | B2 | 6/2019 | Noel |
| RE47,757 | E | 12/2019 | Hering |
| 10,516,761 | B1 | 12/2019 | A |
| 10,601,854 | B2 | 3/2020 | Lokamathe |
| 10,771,489 | B1 | 9/2020 | Bisht |
| 10,812,499 | B2 | 10/2020 | Hassanzadeh |
| 10,904,270 | B2 | 1/2021 | Muddu |
| 11,265,292 | B1 | 3/2022 | Leviseur |
| 11,647,039 | B2 * | 5/2023 | Crabtree ............... H04L 63/20 726/22 |
| 11,757,920 | B2 * | 9/2023 | Crabtree ............... H04L 41/145 726/22 |
| 2006/0265324 | A1 | 11/2006 | Leclerc |
| 2007/0011319 | A1 | 1/2007 | McClure |
| 2008/0098479 | A1 | 4/2008 | O'Rourke |
| 2008/0104665 | A1 | 5/2008 | Naldurg |
| 2008/0172716 | A1 | 7/2008 | Talpade |
| 2009/0077666 | A1 | 3/2009 | Chen |
| 2009/0265199 | A1 | 10/2009 | Moerdler |
| 2010/0095381 | A1 | 4/2010 | Levi |
| 2010/0192195 | A1 | 7/2010 | Dunagan |
| 2013/0232331 | A1 | 9/2013 | Farhan |
| 2013/0247205 | A1 | 9/2013 | Schrecker |
| 2015/0058993 | A1 | 2/2015 | Choi |
| 2015/0244734 | A1 | 8/2015 | Olson |
| 2016/0050116 | A1 | 2/2016 | Sheshadri |
| 2016/0205122 | A1 | 7/2016 | Bassett |
| 2017/0034023 | A1 | 2/2017 | Nickolov |
| 2017/0078320 | A1 | 3/2017 | Hughes |
| 2017/0177740 | A1 | 6/2017 | Abaya |
| 2017/0195349 | A1 | 7/2017 | Shabtai |
| 2017/0286690 | A1 | 10/2017 | Chari |
| 2017/0289187 | A1 | 10/2017 | Noel |
| 2017/0324768 | A1 | 11/2017 | Crabtree |
| 2018/0210927 | A1 | 7/2018 | Karam |
| 2018/0322407 | A1 | 11/2018 | Baum |
| 2019/0098039 | A1 | 3/2019 | Gates |
| 2020/0053116 | A1 | 2/2020 | Soroush |
| 2020/0110774 | A1 | 4/2020 | Lakshmanan |
| 2020/0137104 | A1 | 4/2020 | Hassanzadeh |
| 2020/0167705 | A1 | 5/2020 | Risoldi |
| 2020/0175174 | A1 | 6/2020 | Bakalli |
| 2020/0177608 | A1 | 6/2020 | Okunlola |
| 2020/0177615 | A1 | 6/2020 | Grabois |
| 2020/0177617 | A1 | 6/2020 | Hadar |
| 2020/0177618 | A1 | 6/2020 | Hassanzadeh |
| 2020/0244691 | A1 | 7/2020 | Veeramany |
| 2020/0311630 | A1 | 10/2020 | Risoldi |
| 2020/0412758 | A1 | 12/2020 | Trivellato |
| 2021/0012012 | A1 | 1/2021 | Soroush |
| 2021/0014065 | A1 | 1/2021 | Gourisetti |
| 2021/0014264 | A1 | 1/2021 | Soroush |
| 2021/0014265 | A1 | 1/2021 | Hadar |
| 2021/0409439 | A1 | 12/2021 | Engelberg |
| 2022/0014534 | A1 | 1/2022 | Basovskiy |
| 2022/0191230 | A1 | 6/2022 | Morgan |
| 2022/0263860 | A1 | 8/2022 | Crabtree |

FOREIGN PATENT DOCUMENTS

| | | |
|---|---|---|
| CN | 107038380 A | 8/2017 |
| CN | 107066256 A | 8/2017 |
| CN | 108123962 A | 6/2018 |
| CN | 110138788 A | 8/2019 |
| CN | 110188871 A | 8/2019 |
| CN | 110191120 A | 8/2019 |
| CN | 111611586 A | 9/2020 |
| CN | 112766374 A | 5/2021 |
| KR | 102079970 B1 | 4/2020 |
| WO | 0070463 A1 | 11/2000 |
| WO | 2007143226 A2 | 12/2007 |
| WO | 2019186722 A1 | 10/2019 |

OTHER PUBLICATIONS

Albanese, M., Pugliese, A., & Subrahmanian, V. (2013). Fast Activity Detection: Indexing for Temporal Stochastic Automaton-Based Activity Models. IEEE Transactions on Knowledge and Data Engineering, 360-373.

Bahl, P., Barham, P., & Black, R. (2006). Discovering Dependencies for Network Management. ACM HotNets.

BeyondTrust. (2018). Retina. Retrieved from Retina: https://www.beyondtrust.com/products/retina-network-security-scanner/.

CyVision. (2018). CyVision. Retrieved from CyVision: https://www.cyvisiontechnologies.com/.

GraphX. (2018). GraphX. Retrieved from GraphX: https://spark.apache.org/graphx/.

Leversage, D., & Byres, E. (2008). Estimating a system's mean time-to-compromise. IEEE Security & Privacy, 52-60.

Mitre. (2018). CVE. Retrieved from CVE: https://cve.mitre.org/.

MSR. (2018). Z3 Guide. Retrieved from Z3 Guide: https://rise4fun.com/z3/tutorialcontent/guide#h23.

Natarajan, A., Ning, P., Liu, Y., Jajodia, S., & Hutchinson, S. (2012). NSDMiner: Automated Discovery of Network Service Dependencies. IEEE INFOCOM.

NIST. (2018). Retrieved form https://nvd.nist.gov/.

OMG. (Mar. 2015). Data Distribution Service Specification Version 1.4. Retrieved from OMG DDS: https://www.omg.org/spec/DDS/About-DDS/.

RTI. (2017). RTI Routing Service. Retrieved from RTI Routing Service: https://rti.com/products/dds/routing-service.html.

SANS. (2002). SANS Institute, "Quantitative Risk Analysis Step-By-Step". Retrieved from Quantitative Risk Analysis Step-by-Step: https://www.sans.org/reading-room/whitepapers/auditing/quantitative-risk-analysis-step-by-step-849.

Schrecker, S., Soroush, H., & Molina, J. (2016). "Industrial Internet of Things vol. G4: Security Framework",. CreateSpace Independent Publishing Platform.

Soroush, H., Irey, P., & Pardo-Castellote, G. (2015). Next-Generation Cybersecurity for Advanced Real-Time Distributed Systems. Intelligent Ships Symposium.

StackOverflow. (2018). StackOverflow. Retrieved from StackOverflow: https://stackflow.com/.

Tenable. (2018). Nessus. Retrieved from Nessus: https://www.tenable.com/products/nessus/nessus-professional.

Venkatesan, S., Albanese, M., & Jajodia, S. (2015). Distributing Stealthy Botnets through Strategic Placement of Detectors. IEEE Conference on Communications and Network Security (IEEE CNS).

Venkatesan, S., Albanese, M., Cybenko, G., & Jajodia, S. (2016). A Moving Target Defense Approach to Disrupting Stealthy Botnets. ACM Workshop on Moving Target Defense (MTD).

Welsh, M. (2013). What I Wish System Researchers Would Work On. Retrieved from http://matt-welsh.blogspot.com/2013/05/what-i-wish-systems-researchers-would.html.

Xu, Tu., & Zhou, Y. (2015). Systems Approaches to Tackling Configuration Errors: A Survey. ACM Comput. Surv.

Gemini George, A Graph-Based Security Framework for Securing Industrial IoT Networks From Vulnerability Exploitations, IEEE Access (vol. 6, pp. 43586-43601), Jan. 1, 2018, 16 pages (Year: 2018).

Brigitte Boden, Mining Coherent Subgraphs in Multi-Layer Graphs with Edge Labels, Data Management and Data Exploration Group RWTH Aachen University, Germany, Proceedings of the 18th ACM SIGKDD international conference on Knowledge discovery and data mining, Aug. 2012 pp. 1258-1266 (Year: 2012).

(56) References Cited

OTHER PUBLICATIONS

Ibifubara Iganibo, Vulnerability Metrics for Graph-based Configuration Security, 2021, Center for Secure Information Systems, George Mason University, Fairfax, U.S.A. ,Palo Alto Research Center, Palo Alto, U.S.A, 12 pages (Year: 2021).

Massimilliano Albanese, A Graphic Model to Assess the Impact of Multi-Step Attacks, Journal of Defense Modeling and Simulation: Applications, Methodology, Technology, 2018, vol. 15(1) 79-93 (Year: 2018) Retrieved from https://journals.sagepub.com/doi/pdf/10.1177/1548512917706043.

Mridul Sankar Barik, A Graph Data Model for Attack Graph Generation and Analysis, Dept. of Comp. Sc. and Engg., Jadavpur University Kolkata, India {msbarikm,chandanm}@cse.jdvu.ac.In. 2014, 12 pages (Year: 2014).

* cited by examiner

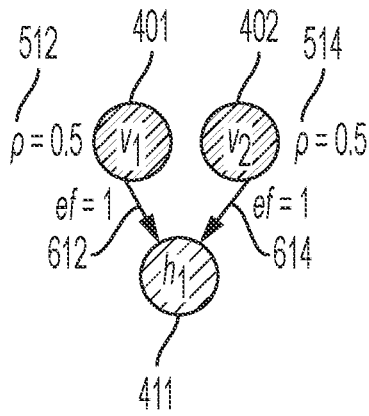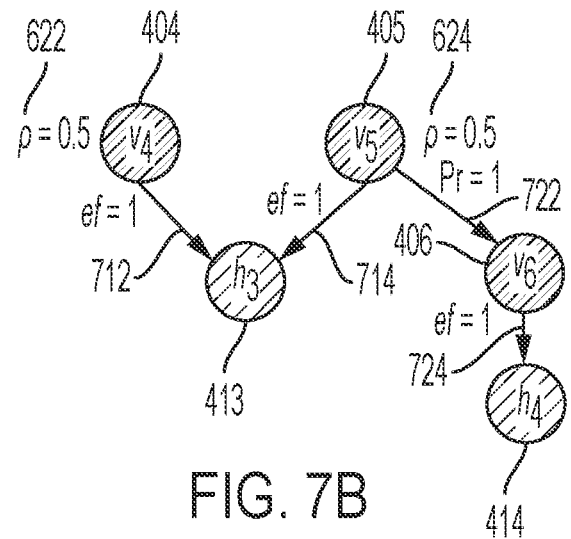
FIG. 7A  FIG. 7B
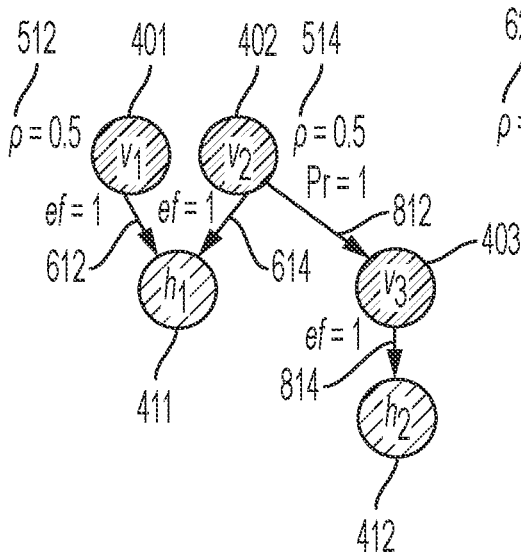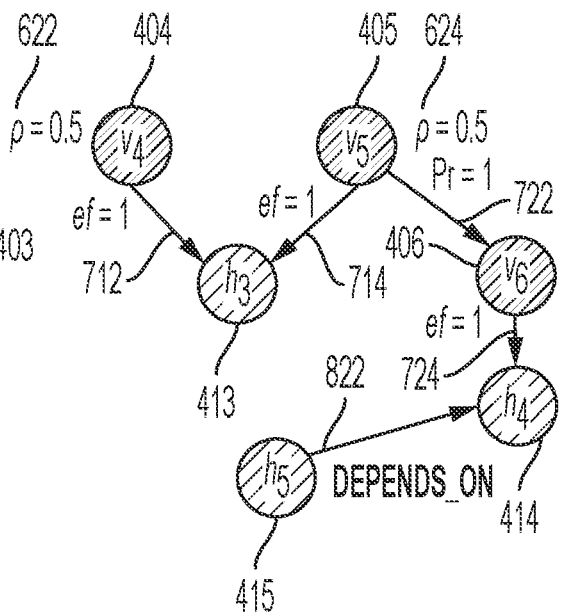
FIG. 8A  FIG. 8B

| Name 1102 | Description 1104 |
|---|---|
| NUM_COMPONENTS | Number of vulnerable components |
| MIN_NUM_VULNS_PER_COMP | Minimum number of vulnerabilities per component |
| MAX_NUM_VULNS_PER_COMP | Maximum number of vulnerabilities per component |
| PROB_INT_VULN | Probability that an external vulnerability is randomly changed to an internal one |
| MIN_NUM_VULNS_PER_VULN | Minimum number of enabling vulnerabilities for an internal vulnerability |
| MAX_NUM_VULNS_PER_VULN | Maximum number of enabling vulnerabilities for an internal vulnerability |
| MIN_NUM_DEP_COMP | Minimum number of dependent components for each vulnerable component |
| MAX_NUM_DEP_COMP | Maximum number of dependent components for each vulnerable component |
| MIN_EXPOSURE_FACTOR | Minimum exposure factor for a vulnerability |
| MAX_EXPOSURE_FACTOR | Maximum exposure factor for a vulnerability |
| MIN_EXPLOITATION_LIKELIHOOD | Minimum exploitation likelihood for a vulnerability |
| MAX_EXPLOITATION_LIKELIHOOD | Maximum exploitation likelihood for a vulnerability |
| PROB_LOGIC_AND | Probability of setting the enabling logic of a vulnerability to AND |
| PROB_CONSTR_RELAX | Probability that a constraint is relaxed |
| ALLOW_DEPENDENCIES | Flag determining whether component dependency should be allowed |
| ALLOW_DEPENDENCY_LOOPS | Flag determining whether dependency loops should be allowed |
| GENERATE_VULN_PATH | Flag determining whether vulnerability paths should be created |

FIG. 11A

|  | SAFETrains | Testbed VSAT-SPOKE | VSAT-RING | UnitTests |
|---|---|---|---|---|
| Operational Constraint Score (OCS) | 0 | 40 | 3,220 | 0 |
| SCIBORG Analysis Score (SAC) | 0 | 40 | 3,220 | 40 |
| Current Configuration Score (CCS) | 7,960 | 1,280 | 3,760 | 120 |
| Worst Case Score (WCS) | 27,610 | 1,280 | 22,420 | 160 |

FIG. 11B

| Name 1152 | Description 1154 |
|---|---|
| NUM_COMPONENTS | 100 |
| MIN_NUM_VULNS_PER_COMP | 10 |
| MAX_NUM_VULNS_PER_COMP | 10 |
| MIN_NUM_DEP_COMP | 0 |
| MAX_NUM_DEP_COMP | 0 |
| MIN_EXPOSURE_FACTOR | 0.1 |
| MAX_EXPOSURE_FACTOR | 0.3 |
| MIN_UTILITY | 5 |
| MAX_UTILITY | 5 |
| MIN_EXPLOITATION_LIKELIHOOD | 0.1 |
| MAX_EXPLOITATION_LIKELIHOOD | 0.3 |
| PROB_CONSTR_RELAX | 0.5 |
| ALLOW_DEPENDENCIES | FALSE |
| GENERATE_VULN_PATH | FALSE |

FIG. 11C

|  | Scenario A Average attack volume | Scenario B Average attack volume |
|---|---|---|
| Generation 1 | 100 | 140 |
| Generation 2 | 225 | 373 |
| Generation 3 | 844 | 1,405 |
| Generation 4 | 1405 | 5,218 |
| Generation 5 | 5,218 | 31,602 |

FIG. 11D

METHOD AND SYSTEM FOR FACILITATING A RANKING SCORE USING ATTACK VOLUME TO FIND OPTIMAL CONFIGURATIONS

RELATED APPLICATIONS

This application claims the benefit of:

U.S. Provisional Application No. 63/334,032, titled "Method and System for Complex System Ranking Score Using an Attack Volume Metric to Find Optimal Configurations," by inventors Massimiliano Albanese, Ibifubara Iganibo, Marc E. Mosko, and Alejandro E. Brito, filed 22 Apr. 2022, which subject matter is related to the subject matter in U.S. patent application Ser. No. 16/219,774, entitled "Method for Improving the Security of a Networked System by Adjusting the Configuration Parameters of the System Components," by inventors Hamed Soroush and Shantanu Rane, filed 13 Dec. 2018 and issued 1 Jun. 2021 as U.S. Pat. No. 11,025,661 (hereinafter "U.S. Pat. No. 11,025,661"), which application claims the benefit of U.S. Provisional Application No. 62/718,328, titled "Method for Improving the Security of a Networked System by Adjusting the Configuration Parameters of the System Components," by inventors Hamed Soroush and Shantanu Rane, filed 13 Aug. 2018; and is further related to U.S. patent application Ser. No. 16/918,971, entitled "System and Method for Constructing a Graph-Based Model for Optimizing the Security Posture of a Composed Internet of Things System," by inventors Hamed Soroush, Milad Asgari Mehrabadi, Shantanu Rane, and Massimiliano Albanese, filed 1 Jul. 2020 (hereinafter "U.S. patent application Ser. No. 16/918,971");

U.S. patent application Ser. No. 16/923,763, entitled "System and Method for Reasoning About the Optimality of a Configuration Parameter of a Distributed System," by inventors Hamed Soroush and Shantanu Rane, filed 8 Jul. 2020 (hereinafter "U.S. patent application Ser. No. 16/923,763"); and U.S. patent application Ser. No. 17/350,221, entitled "System and Method for Determining Vulnerability Metrics for Graph-Based Configuration Security," by inventors Massimiliano Albanese and Marc E. Mosko, filed 17 Jun. 2021 (hereinafter "U.S. patent application Ser. No. 17/350,221"), the disclosures of which are herein incorporated by reference in their entirety.

STATEMENT OF GOVERNMENT-FUNDED RESEARCH

This invention was made with U.S. government support under (Contract Number) Award Number: FA8750-18-2-0147 awarded by the Defense Advanced Research Projects Agency (DARPA) of the Department of Defense (DoD). The U.S. government has certain rights in the invention.

BACKGROUND

Field

This disclosure is generally related to improving the security of a network system of components. More specifically, this disclosure is related to a method and system for facilitating a ranking score using attack volume to find optimal configurations.

Related Art

As cybersystems become increasingly complex and connected, configuration analytics may play a critical role in the correct and secure operation of cybersystems or composed systems (e.g., a networked Industrial Control System (ICS) or an Internet of Things (IoT) system). Given the significant number of interconnected components in a composed system, providing the appropriate level of security for such networked systems may pose a challenge. For example, a majority of the security compromises in IoT systems can be attributed to misconfigurations, i.e., combinations of configuration parameters of the individual system components that expose vulnerabilities to an adversary. Attackers may rely on unpatched vulnerabilities and configuration errors to gain unauthorized access to system resources. Misconfigurations can occur at any level of a system's software architecture. Thus, correctly configuring systems can become increasingly complex given multiple interconnected systems.

Current solutions may focus on assessing the impact of potential attacks on a system by defining or quantifying its "attack surface," which is generally known as ways in which an adversary can enter a system from a set of points on the boundary of the system and potentially cause damage. Some current solutions may consider only the entry and exit point of an attacker, while other current solutions may use an attacker-centric or a system-centric approach. Still other current solutions may only consider physical access to a system as the potential entry point, or may require expert knowledge of the system and the attacker.

Thus, current solutions lack a principled approach to managing the complex relationships between the configuration parameters of the many components of a composed system, and do not leverage the complex relationships among the configuration parameters of the individual system components. Furthermore, current solutions account for neither the vulnerabilities which are not at the boundary of the system nor the dependencies among the components and configuration parameters of the interconnected system components. That is, current solutions do not consider the intrinsic relationships between vulnerabilities, components, and system configurations, which can result in cascading and unaccounted—for failures. This in turn can result in improperly or inefficiently measuring the attack surface of the system, which can affect the security of a cybersystem or other distributed system.

SUMMARY

One embodiment provides a system which facilitates a ranking score using attack volume to find optimal configurations of a system. During operation, the system determines, in a graph which represents a system of components: vulnerability nodes which represent known vulnerabilities to the system, wherein exposed vulnerability nodes represent vulnerabilities at a perimeter of the system and non-exposed vulnerability nodes represent vulnerabilities not at the perimeter of the system, and wherein the exposed vulnerability nodes are each associated with a first likelihood of exploitation and the non-exposed vulnerability nodes are each associated with a second likelihood of exploitation based on a prior likelihood associated with a prior vulnerability node which enables a respective non-exposed vulnerability node; and dependency nodes which represent the components in the system, wherein direct dependency nodes are each associated with an exposure factor which indicates an amount of degradation caused to a respective component based on exploitation of a respective vulnerability which directly degrades the respective component. The system calculates, across all the non-exposed vulnerability nodes and all the direct dependency nodes, a score which indicates an attack volume of the system using a metric which is based on at least: a respective second likelihood associated with a first non-exposed vulnerability node; an exposure factor associated with a respective dependency node which represents a component directly degraded based on exploitation of a vulnerability represented by the first non-exposed vulnerability node; and a loss of utility of the component represented by the respective dependency node. The score is calculated for one or more configurations of the system. The system selects, based on the calculated score for the one or more configurations, a first configuration of the one or more configurations which optimizes a configuration of the system.

In some embodiments, the graph comprises a multi-layer graph which includes a configuration subgraph, a vulnerability subgraph, and a dependency subgraph. The vulnerability subgraph includes the vulnerability nodes, which include the exposed vulnerability nodes and the non-exposed vulnerability nodes. A directed edge from an exposed vulnerability node or a first non-exposed vulnerability node to a second non-exposed vulnerability node is associated with the second likelihood.

In some embodiments, calculating the score using the metric is further based on: a weighted summation of a loss of utility, across all the components represented by the direct dependency nodes, caused by an exploitation of any vulnerability which directly or indirectly degrades a respective component, wherein a respective second likelihood associated with a respective non-exposed vulnerability node is used as a weight in the weighted summation.

In some embodiments, the dependency graph includes the dependency nodes, which include the direct dependency nodes and indirect dependency nodes. A respective indirect dependency node is associated with a respective dependency function which indicates a level of dependency of the respective indirect dependency node upon a dependency node reachable by a directed edge from the respective indirect dependency node to the dependency node.

In some embodiments, calculating the score is performed across all the non-exposed vulnerability nodes, all the direct dependency nodes, and all the indirect dependency nodes using the metric and is further based on: the respective dependency function associated with the respective indirect dependency node.

In some embodiments, calculating the score using the metric is further based on: a set of components which depend upon a respective component represented by the respective direct dependency node based on a chain of directed edges.

In some embodiments, the system applies a second configuration for the system based on the calculated score for the second configuration using the metric, wherein the second configuration prioritizes a set of actions based on the calculated score for the second configuration.

In some embodiments, the system applies, based on the calculated score for the one or more configurations using the metric, an artificial intelligence search or a dynamic programming tool to obtain a third configuration which has an improved security posture over at least one of the one or more configurations.

In some embodiments, the system displays, on a screen of a user device, one or more interactive elements which allow the user to: view the multi-layer graph, including the vulnerability nodes, the dependency nodes, directed edges, the first and second likelihoods of exploitation associated with the exposed and non-exposed vulnerability nodes, exposure factors, and dependency functions in any of the configuration subgraph, the vulnerability subgraph, and the dependency subgraph; view or modify configuration parameters for the system using a graph generation tool to obtain the one or more configurations; calculate the score using the metric for the one or more configurations; view the calculated score for the one or more configurations; select a first configuration of the one or more configurations; view an average attack volume for the selected first configuration; and view an explanation of evidence associated with the selected configuration.

In some embodiments, the first likelihood of exploitation and the second likelihood of exploitation are associated with a Common Vulnerability Scoring System exploitability score.

In some embodiments, the score is at least one of: a first score calculated based on eliminating security constraints which contradict operational requirements, wherein the first score defines a lower bound on the attack volume; a second score calculated based on maintaining operation of a testbed while considering settings of current values, wherein when a current value is not feasible against a set of non-relaxable constraints, the current value is invalidated, which enables a set of vulnerabilities associated with the current value, and wherein when the current value is feasible against the set of non-relaxable constraints, the system relaxes all conflicting relaxable constraints; a third score calculated based on a recommended configuration; and a fourth score calculated based on relaxing all constraints of the testbed, wherein the fourth score defines an upper bound on the attack volume.

In some embodiments, selecting the first configuration which optimizes the configuration of the system is based on at least one of a security priority and an operational priority.

BRIEF DESCRIPTION OF THE FIGURES

FIGS. 7A and 7B present exemplary configurations which can be compared using generation 4 metrics, in accordance with an embodiment of the present application.

FIGS. 8A and 8B present exemplary configurations which can be compared using generation 5 metrics, in accordance with an embodiment of the present application.

FIG. 11A depicts a table indicating configurable parameters of a graph generation tool, in accordance with an embodiment of the present application.

FIG. 11B depicts a table indicating scores based on various testbeds, in accordance with an embodiment of the present application.

FIG. 11C depicts a table indicating a baseline configuration for a first scenario using generation 1 metrics, in accordance with an embodiment of the present application.

FIG. 11D depicts a table indicating the effectiveness of using the metrics from generations 1-5 in discrimination between pairs of configurations, in accordance with an embodiment of the present application.

In the figures, like reference numerals refer to the same figure elements.

DETAILED DESCRIPTION

Figure 1:
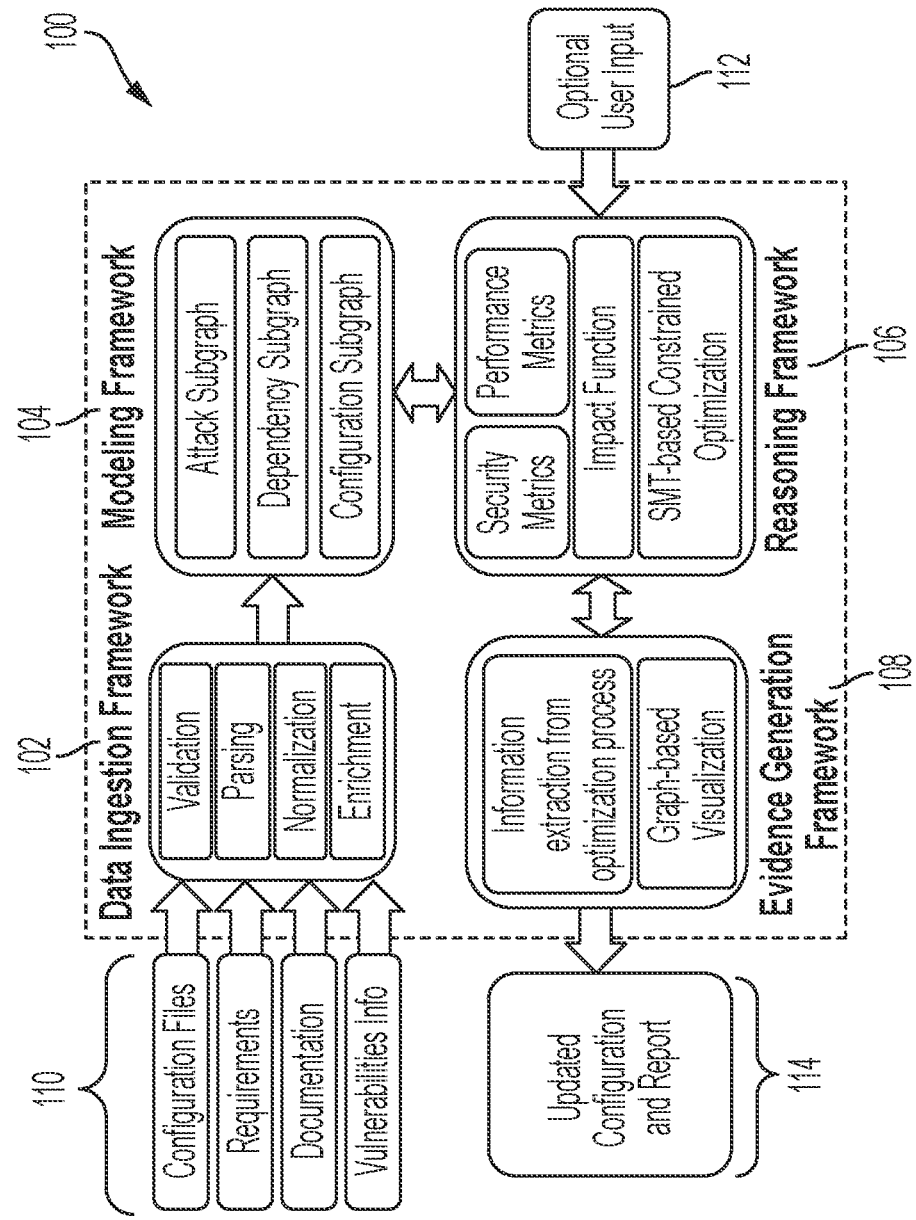
FIG. 1 illustrates an exemplary environment for facilitating an improvement in the security versus functionality tradeoff of a composed system, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Introduction and Overview

The embodiments described herein provide an improvement to the traditional method of quantifying the extent of an attack surface of a system of components, by providing a system which considers not only the set of points on the boundary of the system from where an attacker may attempt to enter, but also the complex interdependencies that exist between the different elements of the system, including its components, vulnerabilities, and configuration parameters. U.S. Pat. No. 11,025,661 describes a larger or "overall system" which can be referred to as secure configurations for the IoT based on optimization and reasoning on graphs (or "SCIBORG"). The overall system can include the following four frameworks: (1) a data ingestion framework; (2) a modeling framework; (3) a reasoning framework; and (4) an evidence generation framework, as summarized below in relation to FIG. 1.

U.S. Pat. No. 11,025,661 also describes how the overall system can model a composed system by constructing a multi-layer graph for a system with a plurality of components. The multi-layer graph can include: a dependency subgraph that captures the functional relationships among system components; a configuration subgraph that accounts for relationships among configuration parameters within and across components; and an attack or vulnerability subgraph modeling the vulnerabilities of the system and the user of those vulnerabilities in multi-step attacks. An exemplary multi-layer graph, including three subgraphs and their constituent components and directed edges, is described below in relation to FIGS. 2B, 2C, and 3A.

As described above, current solutions which work on minimizing the attack surface of a system do not capture the intricate relationships between configuration parameters, attack paths available to an adversary, and functional dependencies among system components. Thus, current solutions generally fail to reduce the risk associated with residual vulnerabilities. The overall system addresses these issues by characterizing the potential impact of multi-step attacks enabled by configuration settings.

The overall system also uses algorithms and software tools to jointly analyze the subgraphs of the multi-layer graph in order to reason about the impact of a candidate configuration set on the security and functionality of the composed system, e.g., by using a Satisfiability Modulo Theory (SMT) solver to express the complex relationships among the configuration parameters as constraints in a security optimization problem, as described in U.S. patent application Ser. No. 16/923,763.

The overall system can be implemented with a scalable pipeline, which can: ingest system requirements, configuration files, software documentation and various types of configuration vulnerabilities (data ingestion framework); based on the data ingested in the data ingestion framework, build a queryable, graph-based representation of the relationships between configuration vulnerabilities and attack scenarios, configuration parameters, and system components (modeling framework); provide an application programming interface (API) to perform a quantitative, comparative analysis of the security impact of configuration settings (reasoning framework); automatically construct a constraint satisfaction problem based on the model and utilize a Z3 SMT solver to solve for optimal parameter values (reasoning framework); and provide human-readable evidence about the optimality of the selected configuration (evidence generation framework).

The embodiments described herein use various metrics to calculate the traditional "attack surface" of a distributed system of networked components by considering not only the traditional attack surface (e.g., "exposed vulnerabilities" at a perimeter of the system from where an attacker may attempt to enter the system), but also the interdependencies between various elements of the system, such as components, vulnerabilities, and configuration parameters. This disclosure refers to a series of "generations" of metrics, identified as generations 1-5, in which each generation can build on the preceding generation of metrics. Each generation of metrics can take into account additional information regarding the complexity of the interdependent nature of a distributed system than the preceding generation(s) of metrics. Specifically, the described embodiments focus on the "generation 4" and "generation 5" metrics.

For example, the described embodiments can use generation 4 metrics that consider all "non-exposed vulnerabilities" which are reachable from an exposed vulnerability, i.e., vulnerabilities which may be exploited as a result of an associated vulnerability. The exposed and non-exposed vulnerabilities can be represented by nodes in the vulnerability subgraph, as described below in relation to FIGS. 2B, 3A, and 3B, while the generation 4 metrics are described below in relation to FIGS. 7A and 7B.

The described embodiments can further use generation 5 metrics that consider the non-exposed vulnerabilities of generation 4 metrics as well as dependencies among components of the distributed system. The components of the distributed system can include components which are directly affected by exploitation of a vulnerability ("direct components") and components which are not directly affected by exploitation of a vulnerability but are dependent upon a direct component ("indirect components"). The direct and indirect components can be represented by nodes in the dependency subgraph, as described below in relation to FIGS. 2B, 3A, and 3B, while the generation 5 metrics are described below in relation to FIGS. 8A and 8B. Because the generation 4 and 5 metrics consider additional characteristics or dimensions of the system in calculating the "attack surface" (additional over the prior generation metrics), this disclosure refers to the generation 4 and 5 metrics as measuring the "attack volume" of a system.

The term "overall system" refers to SCIBORG, which includes the four frameworks (i.e., data ingestion framework, modeling framework, reasoning framework, and evidence generation framework). The terms "modeling framework" and "modeling module" are used interchangeably in this disclosure, and refer to one of the four frameworks of the overall system or SCIBORG, as described in U.S. patent application Ser. No. 16/918,971. The terms "reasoning framework" and "reasoning module," and "reasoner" are used interchangeably in this disclosure, and refer to one of the four frameworks of the overall system or SCIBORG, as described in U.S. patent application Ser. No. 16/923,763. The term "system" can refer to the overall system as described in U.S. Pat. No. 11,025,661 and to the embodiments of the system as described herein.

The terms "vulnerability graph" and "attack graph" are used interchangeably in this disclosure and refer to one of the three subgraphs of the generated multi-layer graph.

The terms "graph" and "subgraph" are used interchangeably in this disclosure to describe the three graphs or subgraphs which make up the multi-layer graph of the described embodiments, i.e.: the configuration graph or subgraph; the vulnerability graph or subgraph; and the dependency graph or subgraph.

The terms "node" and "vertex" are used interchangeably in this disclosure and refer to a point, unit, or object in a graph or subgraph.

The vulnerability subgraph may include vulnerability nodes which represent known vulnerabilities to the system. Vulnerability nodes can include: "exposed vulnerability nodes" which represent "exposed vulnerabilities" at a perimeter of the system, such as those existing on public-facing subsystems (e.g., web server, public ftp servers); and "non-exposed vulnerability nodes" which represent "non-exposed vulnerabilities" or "internal vulnerabilities" which are not at the perimeter of the system. In this disclosure, the terms "vulnerability node" and "vulnerability" may be used interchangeably, especially when describing the metrics of generations 1-5 and as related to FIGS. 4A-B, 5A-B, 6A-B, 7A-B, and 8A-B.

The dependency subgraph may include dependency nodes which represent components in the system. Dependency nodes can include: "direct dependency" nodes which represent "direct components" which are each connected by a directed edge from a vulnerability; and "indirect dependency nodes" which represent "indirect components" which are not connected by a directed edge from a vulnerability but depend upon a direct component, which dependency can be indicated as a directed edge from an indirect dependency node to a direct dependency node.

High-Level Overview of System with Four Frameworks/Modules

FIG. 1 illustrates an exemplary environment 100 for facilitating an improvement in the security versus functionality tradeoff of a composed system, in accordance with an embodiment of the present application. Environment 100 can depict or indicate the overall system or SCIBORG. The overall system can include a data ingestion framework 102, a modeling framework 104, a reasoning framework 106, and an evidence generation framework 108. Data ingestion framework 102 can determine information sources associated with software, hardware, middleware, and networking components of a system, and can further receive data from those information sources as input (e.g., input 110 which can include configuration files, functional requirements, documentation, and vulnerabilities information).

Modeling framework 104 can take as input information obtained, ingested, and extracted by data ingestion framework 102, and can produce as output three subgraphs which comprise the multi-layer graph described herein: an attack subgraph 122; a dependency subgraph 124; and a configuration subgraph 126. A detailed flow of the operations performed by modeling framework 104 is described below in relation to FIGS. 2B, 3, 5, 6A, and 6B. Reasoning framework 106 can use the constructed multi-layer graph output by modeling framework 104, and reasoning framework 106 can also receive an optional user input 112. Evidence generation framework 108 can use as input the output of reasoning framework 106, and evidence generation framework 108 can produce as output an updated configuration and report 114.

Exemplary Network Diagram and Corresponding Multi-Layer Graph

Figure 2A:
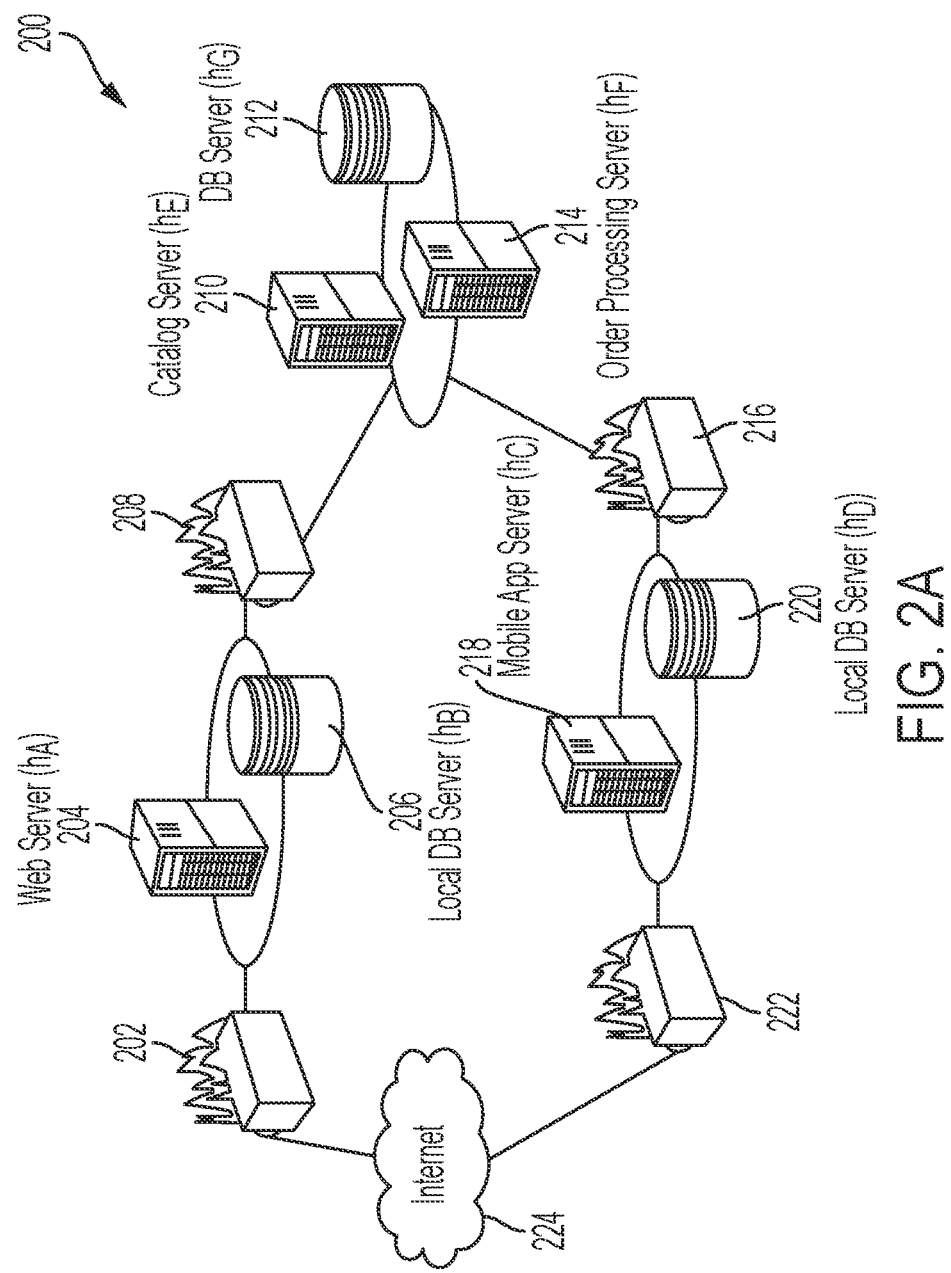
FIG. 2A illustrates an exemplary network diagram of an e-commerce system, in accordance with an embodiment of the present application.

FIG. 2A illustrates an exemplary network diagram 200 of an e-commerce system, in accordance with an embodiment of the present application. Diagram 200 can include clusters or groups of entities separated by firewalls and connected via a network 224 (e.g., the internet). For example, a first set of entities can include a Web Server 204 ($h_A$) and a Local Database Server 206 ($h_B$). The first set of entities can be separated by a firewall 208 from a second set of entities, which can include a Catalog Server 210 ($h_E$), a Database Server 212 ($h_G$), and an Order Processing Server 214 ($h_F$). The second set of entities can be separated by a firewall 216 from a third set of entities, which can include a Mobile Application Server 218 ($h_C$) and a Local Database Server 220 ($h_D$). The third set of entities can be separated by a firewall 222 from network or internet 224, and the first set of entities can be separated by a firewall 202 from network or internet 224. Entities in a same or different group may be dependent upon each other, as depicted below in relation to FIG. 2B.

Figure 2B:
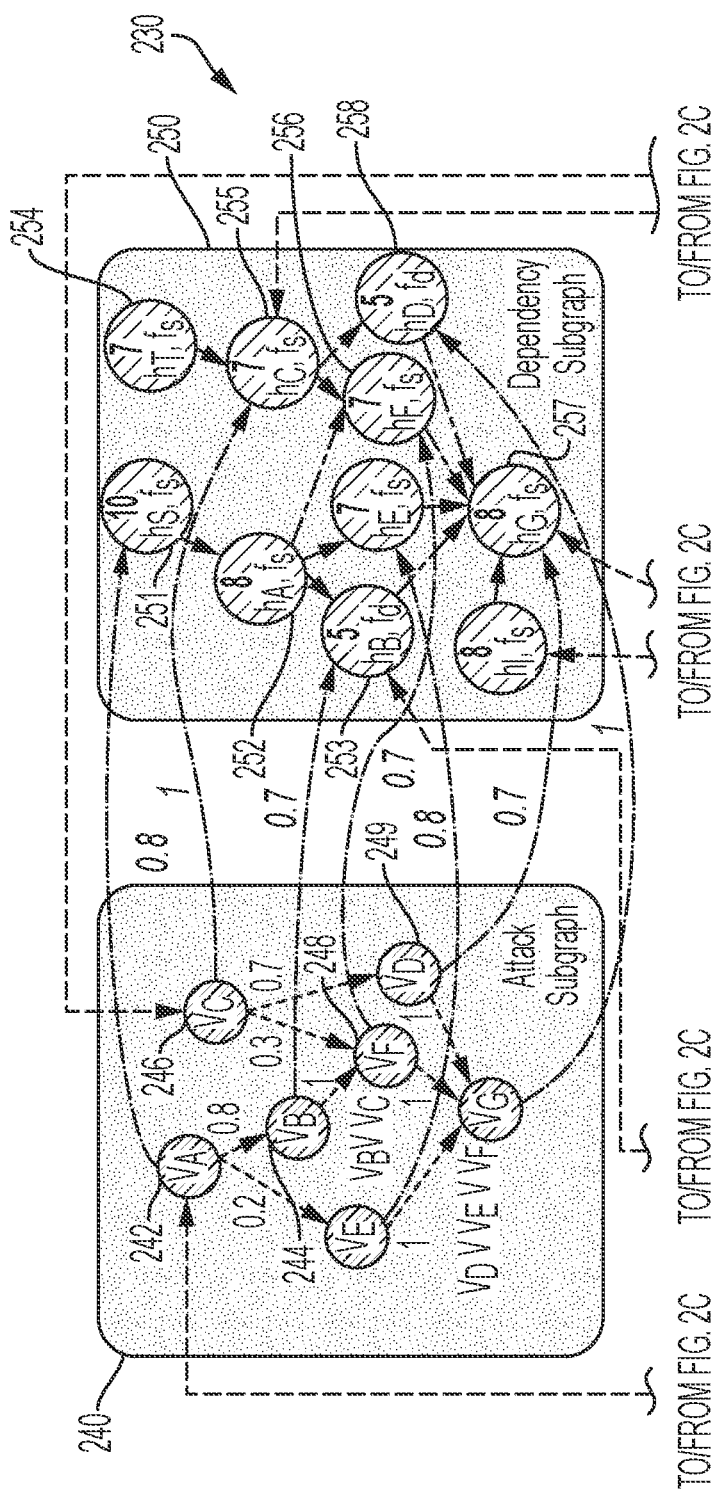
FIGS. 2B and 2C illustrates an exemplary multi-layer graph corresponding to the network diagram of FIG. 2A, in accordance with an embodiment of the present application.
Figure 2C:
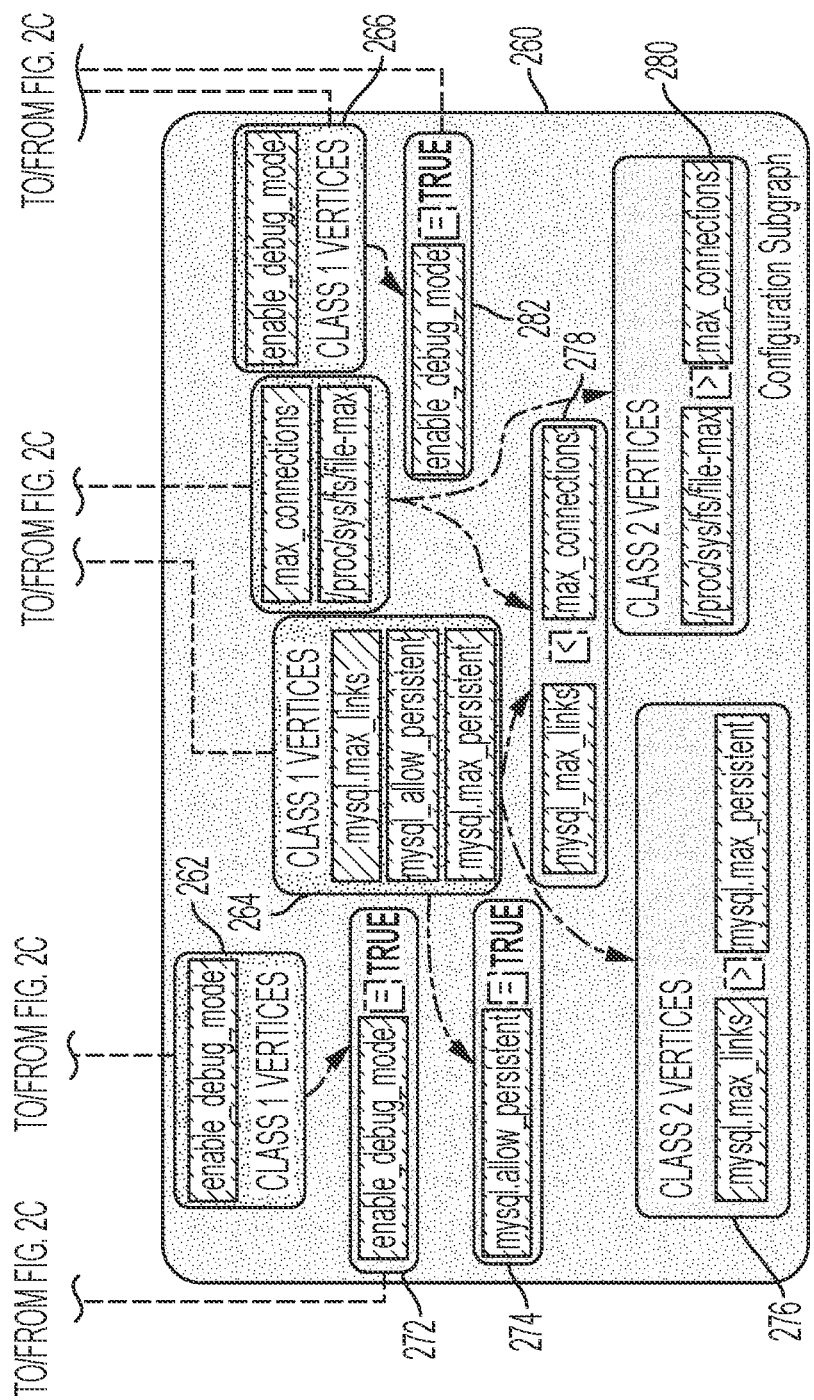

FIGS. 2B and 2C illustrates an exemplary multi-layer graph 230 corresponding to the network diagram of FIG. 2A, in accordance with an embodiment of the present application. Multi-layer graph 230 can include an attack subgraph 240, a dependency subgraph 250, and a configuration subgraph 260.

As described above, modeling framework 104 of FIG. 1 can use the ingested data from data ingestion framework 102 to construct a three-layer directed graph that efficiently encodes the information needed for computing optimal configurations. A first layer can comprise a dependency subgraph, a second layer can comprise a configuration subgraph, and a third layer can comprise an attack subgraph. The edges between these three subgraphs can determine the functional composition and the attack surface for a configuration set, as described in detail below.

The dependency subgraph (subgraph 250) represents the functional dependencies between components of the target composed system. In this subgraph, each vertex represents a functional component of the system and carries a utility value. Each vertex also has a label identifying one of three dependency types, as described below. Each edge in the dependency subgraph represents a functional dependency on another component, as specified by the dependency label of the parent vertex.

The configuration subgraph (subgraph 260) represents relationships between configuration parameters, both within any system component and across different components of the composed system. There are two classes of vertices in the configuration subgraph: a first class of nodes or "Class 1" vertices capture per-component configuration parameters; and a second class of nodes or "Class 2" vertices capture relationships among (or conditions on) the configuration parameters. These relationships are specified by functional system requirements and admissibility of the configuration setting, as described below. Furthermore, some of the relationships between the configuration parameters enable or disable preconditions for system vulnerabilities, which can result in inducing a particular attack subgraph for that configuration. Similar to these relationships among configuration parameters, a particular parameter assignment can also create a precondition for a vulnerability which can be exploited, thus providing an entry point into the attack subgraph.

For example, configuration subgraph 260 can include Class 1 vertices 262, 264, and 266, where each group of Class 1 vertices is depicted in its own box and corresponds to configuration parameters for a specific component depicted in dependency subgraph 250. Furthermore, configuration subgraph 260 can include Class 2 vertices 272, 274, 276, 278, 280, and 282, where each respective Class 2 vertex is depicted in its own box and corresponds to a configuration constraint between configuration parameters (whether between configuration parameters within a same component or across different components), such as the configuration parameters indicated by Class 1 vertices 262-266.

The attack subgraph (subgraph 240) represents the propagation of potential multi-step attacks on components in the dependency graph for a particular configuration. In the attack subgraph, each vertex represents a vulnerability. An edge in the attack subgraph indicates that exploiting the parent vulnerability (a node at the start of a first green-colored arrow) can set the stage for the attacker to exploit the child vulnerability (a node at the end of the first green-colored arrow). Each edge is also labeled with a probability value or "exploitation likelihood," representing the probability of the attack progressing along that edge. The nodes and edges in attack subgraph 240 are described below.

Exemplary High-Level Multi-Layer Graph

U.S. patent application Ser. No. 16/918,971 describes the construction of the multi-layer graph, with nodes and directed edges, including: modeling dependencies in the dependency subgraph; modeling relationships between configuration parameters, both within and a component and across different components, in the configuration subgraph, where some relationships between configuration parameters may enable or disable preconditions for vulnerabilities in one or more components; and modeling vulnerabilities to represent each possible exploitation or security condition. An example of how nodes from the three subgraphs may affected each other (e.g., via directed edges) is described below in relation to FIGS. 3A and 3B.

Figure 3A:
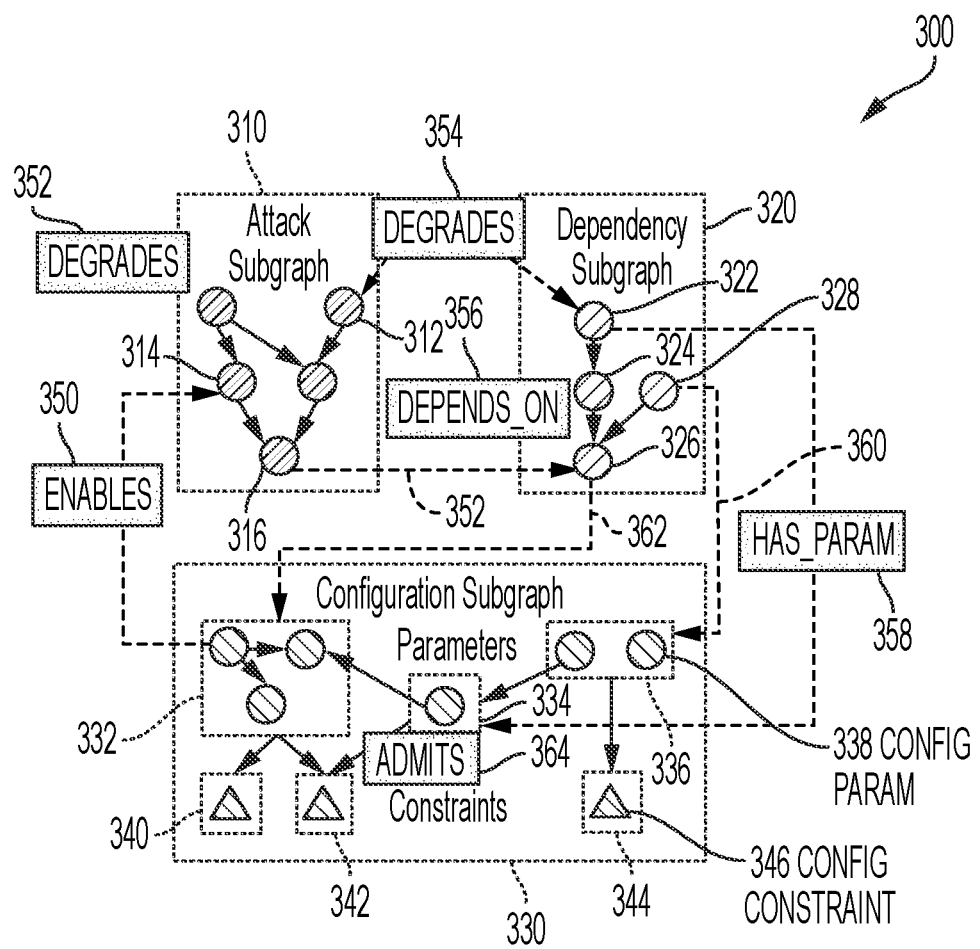
FIG. 3A illustrates an exemplary high-level diagram of a multi-layer graph, including semantics of the relationships among subgraphs, in accordance with an embodiment of the present application.

FIG. 3A illustrates an exemplary high-level diagram 300 of a multi-layer graph, including semantics of the relationships among subgraphs, in accordance with an embodiment of the present application. Diagram 300 can include: an attack subgraph 310, with each vulnerability node depicted as a red-colored circle, and relationships between vulnerability nodes depicted as black arrows; a dependency subgraph 320, with each component node depicted as a blue-colored circle, and relationships between component nodes depicted as black arrows; and a configuration subgraph 330, with configuration parameters depicted as green-colored circles and configuration constraints depicted as green-colored triangles.

Configuration subgraph 330 can include two types of nodes or vertices, as described above in relation to FIG. 2B. "Class 1" vertices capture per-component configuration parameters, e.g., the green-colored circles in boxes 332, 334, and 336. For example, box 336 includes a configuration parameter 338, which is a Class 1 vertex. "Class 2" vertices capture relationships among (or conditions on) the configuration parameters, e.g., the green-colored triangles in boxes 340, 342, and 344. For example, box 344 includes a configuration constraint 346, which is a Class 2 vertex.

In configuration subgraph 330, relationships within and across components are depicted as black arrows between the green-colored circles, while constraints between and among the components are depicted as black arrows between the Class 1 vertices and the Class 2 vertices.

Furthermore, configuration subgraph 330 indicates several semantics regarding the relationships of the nodes within each subgraph as well as the relationships of the nodes across subgraphs, e.g., via directed edges. For example, a configuration constraint 340 enables (350, indicated by a purple dashed arrow) a vulnerability 314. A vulnerability 316 degrades (352, indicated by a purple dashed arrow) or represents the exposure factor of the component indicated by a dependency subgraph node 326 based on the exploitation of vulnerability 316. Similarly, a vulnerability 312 degrades (354, indicated by a purple dashed arrow) or represents the exposure factor of the component indicated by a dependency subgraph node 322 based on the exploitation of vulnerability 312.

In addition, dependency subgraph node 324 depends on (356, indicated with a black arrow) dependency subgraph node 326. Dependency subgraph node 322 is associated with or has parameters (358, indicated by a purple dashed line) indicated in a node of Class 1 vertices in box 334 (e.g., configuration parameters associated with the component represented by dependency subgraph node 322). Similarly, dependency subgraph node 328 is associated with or has parameters (360, indicated by a purple dashed line) indicated in a node of Class 1 vertices in box 336 (e.g., configuration parameters 338 associated with the component represented by dependency subgraph node 328). Similarly, dependency subgraph node 326 is associated with or has parameters (362, indicated by a purple dashed line) indicated in a node of Class 1 vertices 332 (e.g., configuration parameters associated with the component represented by dependency subgraph node 326).

Moreover, a configuration subgraph node of a Class 1 vertex in box 334 identifies or admits (364, indicated with a black arrow) the relationship of the configuration parameters involved in the configuration constraint of Class 2 vertex 342.

U.S. patent application Ser. No. 17/350,221 describes ways to quantify different dimensions of the vulnerability subgraph, including the "exploitation likelihood" (or "likelihood") of a vulnerability as the probability that an attacker will attempt to exploit that vulnerability. U.S. patent application Ser. No. 17/350,221 also describes computing a probability distribution over outgoing directed edges from any given vulnerability node to another vulnerability node (defined as "ENABLES" edges). U.S. patent application Ser. No. 17/350,221 further describes how the "exposure factor" can represent the relative damage that an undesirable event (e.g., an exploitation of a vulnerability) may cause to an affected asset.

Figure 3B:
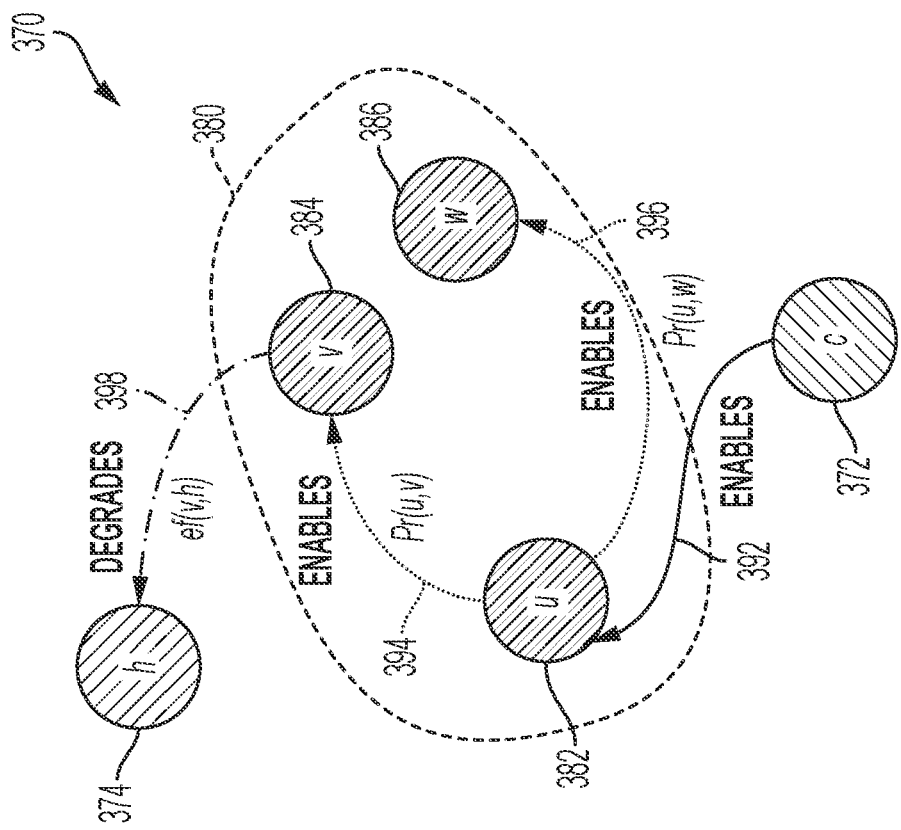
FIG. 3B illustrates an exemplary diagram of nodes in a multi-layer graph, including directed edges between nodes, in accordance with an embodiment of the present application.

FIG. 3B illustrates an exemplary diagram 370 of nodes in a multi-layer graph, including directed edges between nodes, in accordance with an embodiment of the present application. Diagram 370 can include nodes from the three subgraphs: a configuration node c 372; an exposed vulnerability node u 382 and non-exposed vulnerability nodes v 384 and w 386 in a vulnerability subgraph 380; and a component node h 374. Directed edges between the nodes can depict certain dependencies between the depicted nodes as well as potential attack paths taken by an attacker. For example, an ENABLES edge 392 can indicate that the attacker may exploit vulnerability u 382 associated with node c 372 in the configuration subgraph. For each node in vulnerability subgraph 380, the system can compute a probability distribution over outgoing ENABLES edges, i.e., ENABLES edges 394 and 396 from node 382. Each node in vulnerability subgraph 380 can be associated with an exploitation likelihood $\rho(v)$. In addition, the system can determine the exposure factor which represents the relative damage to an asset in the overall system that would be caused due to the exploitation of a vulnerability. Determining the exploitation likelihood for a vulnerability and the exposure factor of a component based on exploitation of an associated vulnerability are described in U.S. patent application Ser. No. 17/350,221.

Overview of Generations of Metrics

As described above, the embodiments described herein use the taxonomy of "generations" of metrics, in which one generation of metrics can build on the preceding generation of metrics. Thus, each subsequent generation of metrics can take into account additional information than the preceding generation(s) of metrics. Each of the five described metrics is accompanied by a pair of exemplary diagrams with configurations of nodes which illustrate a comparison of an evaluation of the configuration using the respective generation of metrics.

One goal of using the described metrics is to determine, for a given system configuration, the maximum damage that may be caused by an attacker. Another goal is to determine, given two different configurations (or a set of configurations), which configuration may provide better protection against potential attacks. Yet another goal is to determine, given multiple available countermeasures, which countermeasure, if deployed, may ensure the lower impact of residual attacks.

—Generation 1 Metrics

Generation 1 metrics can assume that the only available information about the system is the set $V^e$ of exposed vulnerabilities, such as those existing on public-facing subsystems (e.g., web server, public ftp servers). One basic generation 1 metric can simply count the number of exposed vulnerabilities:

$$as_1 = |V^e| \qquad (1)$$

Figure 4A:
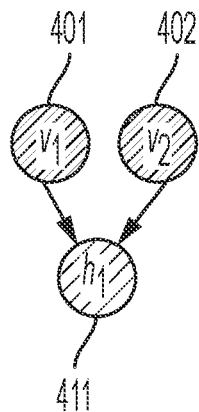
FIGS. 4A and 4B present exemplary configurations which can be compared using generation 1 metrics, in accordance with the prior art.
Figure 4B:
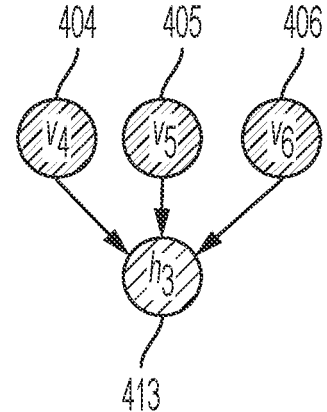

FIGS. 4A and 4B present exemplary configurations which can be compared using generation 1 metrics, in accordance with the prior art. FIG. 4A can include a host $h_1$ 411 which exposes two vulnerabilities $v_1$ 401 and $v_2$ 402, while FIG. 4B can include a host $h_3$ 413 which exposes three vulnerabilities $v_4$ 404, $v_5$ 405, and $v_6$ 406. Given no additional information, it can be intuitively concluded that the FIG. 4B scenario is less secure than the FIG. 4A scenario because the FIG. 4B scenario exposes more vulnerabilities (three versus two).

A slightly more sophisticated generation 1 metric can provide different weights for different subsets of vulnerabilities. For example, vulnerabilities on public ftp servers may be more critical than vulnerabilities on a web server. If $\{V_1^e, V_2^e, \ldots, V_m^e\}$ is a partition of $V^e$, this metric can be defined as:

$$as_1^* = \sum_{i=1}^{k} w_i \cdot |V_i^e| \qquad (2)$$

where $w_i$ is the weight assigned to vulnerabilities $V_i^e$.

—Generation 2 Metrics

Generation 2 metrics can assume that, in addition to knowing what vulnerabilities are exposed, the system can assess the likelihood $\rho(v)$ that each vulnerability $v \in V^e$ will be exploited. The simplest generation 2 metric can sum the likelihoods of exposed vulnerabilities:

$$as_2 = \sum_{v \in V^e} \rho(v) \qquad (3)$$

Figure 5A:
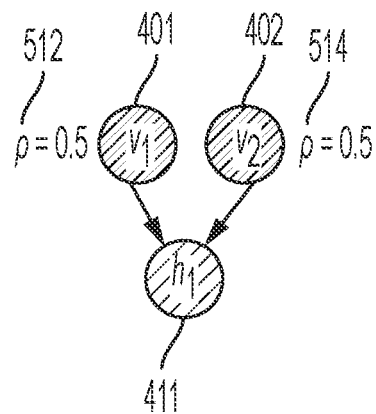
FIGS. 5A and 5B present exemplary configurations which can be compared using generation 2 metrics, in accordance with an embodiment of the present application.
Figure 5B:
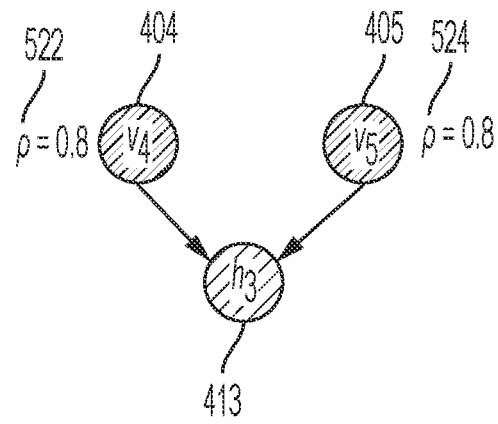

Generation 1 metrics are not able to discriminate between two systems with the same number of vulnerabilities, but different likelihoods for the exposed vulnerabilities. For example, FIGS. 5A and 5B present exemplary configurations which can be compared using generation 2 metrics, in accordance with an embodiment of the present application. FIGS. 5A and 5B represent two systems with the same number of exposed vulnerabilities.

FIG. 5A can include host $h_1$ 411 which exposes two vulnerabilities $v_1$ 401 and $v_2$ 402, while FIG. 4B can include host $h_3$ 413 which exposes two vulnerabilities $v_4$ 404 and $v_5$ 405. However, vulnerabilities in the FIG. 5A scenario have a likelihood 512 and 514 of 0.5 (as indicated, respectively, for vulnerability node $v_1$ 401 and vulnerability node $v_2$ 402), whereas vulnerabilities in the Scenarios B configuration have a likelihood 522 and 524 of 0.8 (as indicated, respectively, for vulnerability node $v_4$ 404 and vulnerability node $v_5$ 405). Given no additional information, it can be intuitively concluded that the FIG. 5B scenario is less secure than the FIG. 5A scenario, because the FIG. 5B scenario exposes vulnerabilities that are more likely to be exploited (0.8 versus 0.5).

—Generation 3 Metrics

Generation 3 metrics can assume that, in addition to all the information available to generation 2 metrics, the system can assess the exposure factor ef(v, h) that defines how the exploitation of each vulnerability $v \in V^e$ degrades any associated components. U.S. patent application Ser. No. 17/350, 221 describes how to determine the exploitation likelihood and exposure factor for a given vulnerability. One generation 3 metric can compute a weighted sum of utility losses across components caused by the exploitation of exposed vulnerabilities, using the respective likelihoods as weights. The loss of utility for a component h due to the exploitation of a vulnerability v can be computed as ef(v, h)·u(h):

$$as_3 = \Sigma_{v \in v^e} \Sigma_{h \in H \, s.t. degrades(v,h)} \rho(v) \cdot ef(v,h) \cdot u(h) \quad (4)$$

Figure 6A:
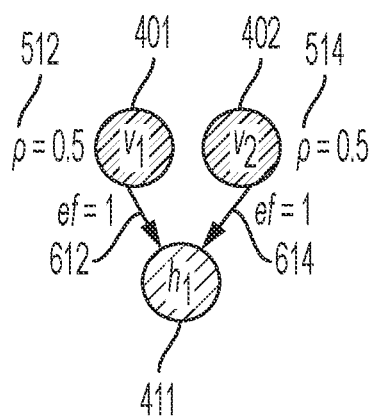
FIGS. 6A and 6B present exemplary configurations which can be compared using generation 3 metrics, in accordance with an embodiment of the present application.
Figure 6B:
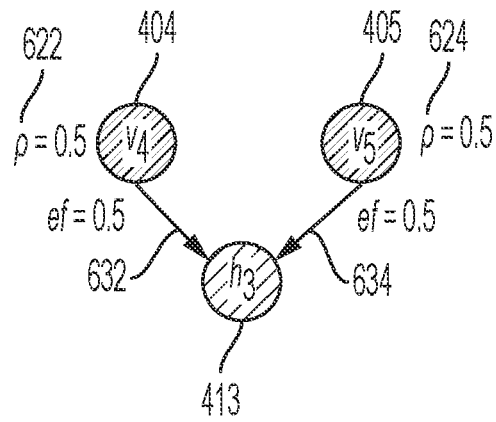

Generation 2 metrics are not able to discriminate between two systems with the same number of vulnerabilities and same likelihoods, but different exposure factors for the exposed vulnerabilities. For example, FIGS. 6A and 6B present exemplary configurations which can be compared using generation 3 metrics, in accordance with an embodiment of the present application. FIGS. 6A and 6B represent two systems with the same number of exposed vulnerabilities, and same likelihood for each vulnerability.

FIG. 6A can include host $h_1$ 411 which exposes two vulnerabilities $v_1$ 401 and $v_2$ 402 (each with a likelihood of 0.5, as indicated by 512 and 514), while FIG. 6B can include host $h_3$ 413 which exposes two vulnerabilities $v_4$ 404 and $v_5$ 405 (each with a likelihood 622 and 624 of 0.5). However, vulnerabilities in the FIG. 6A scenario have an exposure factor of 1 (as indicated by a directed edge 612 between $v_1$ 401 and $h_1$ 411 and by a directed edge 614 between $v_2$ 402 and $h_1$ 411), whereas vulnerabilities in the FIG. 6B scenario have an exposure factor of 0.5 (as indicated by a directed edge 632 between $v_4$ 404 and $h_3$ 413 and by a directed edge 634 between $v_5$ 405 and $h_3$ 413). Given no additional information, it can be intuitively concluded that the FIG. 6B scenario is more secure than the FIG. 6A scenario, because the FIG. 6B scenario exposes vulnerabilities that, if exploited, have a smaller impact (0.5 versus 1).

—Generation 4 Metrics

Generation 4 metrics can assume that, in addition to all the information available to generation 3 metrics, the system has information about all the vulnerabilities in the system and their dependencies, encoded as ENABLES edges in the vulnerability subgraph. This knowledge can allow the system to consider the impact of exploiting additional vulnerabilities after the exploitation of any exposed ones. That is, generation 4 metrics can take into account where a given vulnerability is located in the system, e.g., exposed or non-exposed and if non-exposed, the likelihood that an attacker will choose to take the path which leads to exploitation of a particular non-exposed vulnerability. The absolute likelihood that a vulnerability will be exposed can be viewed as an intrinsic property of the vulnerability. A difference exists between this absolute likelihood and the actual likelihood that the vulnerability will be exploited. This difference can be referred to as the "adjusted likelihood" of exploitation and thus takes into account the dependencies between vulnerabilities, i.e., non-exposed vulnerability nodes which are connected by a directed edge from an exposed vulnerability or another non-exposed vulnerability.

Given a non-exposed vulnerability $v \in V \backslash V^e$, its adjusted likelihood $\rho^*(v)$ can be defined as:

$$\rho^*(v) = \max_{u \in V \, s.t. \, enables(u,v)} \rho^*(u) \cdot Pr(u,v) \quad (5)$$

where, for each $v \in V^e$, $\rho^*(v) = \rho(v)$. As described in U.S. patent application Ser. No. 17/350,221, each vulnerability (whether exposed or non-exposed) can be assigned a likelihood. In this disclosure, the system determines the likelihood $\rho(v)$ for an exposed vulnerability $v \in V^e$ (also referred to as a "first likelihood"), and the generation 4 metrics can compute the adjusted likelihood $\rho^*(v)$ (also referred to as a "second likelihood") for a non-exposed vulnerability $v \in V \backslash V^e$ to account for the fact that an attacker, in order to exploit a non-exposed vulnerability $v \in V \backslash V^e$, would first need to exploit vulnerabilities (one or more) on a path leading to v, which can decrease the true likelihood of exploiting v.

The exploitation likelihood $\rho(v)$ can be interpreted as the conditional probability that v is exploited give that all preconditions are met. For vulnerabilities with preconditions that are not initially satisfied, the adjusted likelihood can factor in the probability that such preconditions are met.

One generation 4 metric can compute a weighted sum of utility losses across components caused by the exploitation of any reachable vulnerability, using the respective adjusted likelihoods as weights:

$$as_4 = \Sigma_{v \in V} \Sigma_{h \in H \, s.t. \, degrades(v,h)} \rho^*(v) \cdot ef(v,h) \cdot u(h) \quad (6)$$

Generation 4 metrics are not able to discriminate between two systems with the same number of vulnerabilities, same likelihoods and exposure factors for all exposed vulnerabilities, but different internal vulnerability paths. For example, FIGS. 7A and 7B present exemplary configurations which can be compared using generation 4 metrics, in accordance with an embodiment of the present application. FIGS. 7A and 7B represent two systems with the same number of exposed vulnerabilities, and the same likelihoods and exposure factors for all exposed vulnerabilities.

FIG. 7A can include host $h_1$ 411 which exposes two vulnerabilities $v_1$ 401 and $v_2$ 402 (each with a likelihood of 0.5, as indicated by 512 and 514, and each with an exposure factor on host $h_1$ 411 of 1, as indicated by directed edges 612 and 614), while FIG. 7B can include host $h_3$ 413 which exposes two vulnerabilities $v_4$ 404 and $v_5$ 405 (each with a likelihood of 0.5, as indicated by 622 and 624, and each with an exposure factor on host $h_3$ 413 of 1, as indicated by directed edges 712 and 714).

However, FIG. 7B can further include a non-exposed or internal vulnerability $v_6$ 406, with a calculated probability of Pr ($v_5$, $v_6$) of 1 (as indicated by a directed edge 722 between exposed vulnerability $v_5$ 405 and non-exposed vulnerability $v_6$ 406). In addition, FIG. 7B can include an exposure factor on host $h_4$ 414 of 1, based on non-exposed vulnerability $v_6$ 406 (as indicated by a directed edge 724). As a result, the FIG. 7B scenario allows an attacker to exploit non-exposed vulnerability $v_6$ 406 after exploiting exposed vulnerability $v_5$ 405, which can lead to a larger overall impact, since an additional component ($h_4$ 414) can be affected. Thus, by using information about dependencies between vulnerabilities as well as the impact of exploiting non-exposed vulnerabilities, generation 4 metrics can provide a more accurate measurement of the attack surface of the system.

—Generation 5 Metrics

The metrics described above for generations 1-4 can provide a means to categorize any existing or future attack surface metrics in a principled and information-centric manner, with each subsequent generation of metrics considering additional information about the system. In addition to all the information considered in generations 1 through 4, the system of the described embodiments can make available information about dependencies among components. The described embodiments of the generation 5 metrics add one more dimension to the analysis, defining a fifth generation of attack surface metrics, which can be referred to as "attack volume metrics" ("avm"):

$$avm = \sum_{v \in V} \sum_{h \in H \text{ s.t. degrades}(v,h)} \quad (7)$$
$$\rho^*(v) \cdot \left\{ ef(v, h) \cdot u(h) + \sum_{h^* \in D_\uparrow(h)} u(h^*) \cdot f_h * (D_\downarrow(h^*)) \right\}$$

where $D_\uparrow(h)$ is the set of components that depend on h, whether directly—through a directed DEPENDS_ON edge to h—or indirectly—through a chain of DEPENDS_ON edges—and $D_\downarrow(h^*)$ is the set of components that h* directly depends on. Thus, for all components that are direct dependent components (i.e., indicated by $D_\uparrow(h)$), the system multiplies the exposure factor ef(v, h) by the loss of utility u(h). For all components which are indirect dependent components (i.e., $D_\downarrow(h^*)$), the system calculates a loss of utility due to propagation of the impact of exploitation of a certain vulnerability such that for each h*, the system multiplies the loss of utility u(h*) by a dependency function $f_{h^*}(D_\downarrow(h^*))$.

Assuming that each vulnerability degrades only one or a few components—thus making the second summation irrelevant for the purpose of complexity analysis—the complexity of computing this metric is O(N·M), where N is the number of vulnerabilities and M is the number of components. Because the number of vulnerabilities is proportional to the number of components, the complexity result can be rewritten as $O(M^2)$. However, only a limited number of components may depend on each given component, therefore processing time may be less than quadratic in practice (as depicted below in the Concrete Results).

Generation 4 metrics are not able to discriminate between two systems that only differ with respect to dependencies among components. However, the information regarding dependencies among components can be a critical piece of information to consider, because cascading failures of multiple components may have a significant impact. For example, FIGS. 8A and 8B present exemplary configurations which can be compared using generation 5 metrics, in accordance with an embodiment of the present application. FIGS. 8A and 8B can represent two almost identical system configurations.

FIG. 8A can include host $h_1$ 411 which exposes two vulnerabilities $v_1$ 401 and $v_2$ 402 (each with a likelihood of 0.5, as indicated by 512 and 514, and each with an exposure factor on host $h_1$ 411 of 1, as indicated by directed edges 612 and 614). FIG. 8A can also include a non-exposed or internal vulnerability $v_3$ 403, with a calculated probability of Pr ($v_2$, $v_3$) of 1 (as indicated by a directed edge 812 between exposed vulnerability $v_2$ 402 and non-exposed vulnerability $v_3$ 403). In addition, FIG. 7B can include an exposure factor on a host $h_2$ 412 of 1, based on non-exposed vulnerability $v_3$ 403 (as indicated by a directed edge 814).

Similarly, 8B can include host $h_3$ 413 which exposes two vulnerabilities $v_4$ 404 and $v_5$ 405 (each with a likelihood of 0.5, as indicated by 622 and 624, and each with an exposure factor on host $h_3$ 413 of 1, as indicated by directed edges 712 and 714). FIG. 7B can also include a non-exposed or internal vulnerability $v_6$ 406, with a calculated probability of Pr ($v_5$, $v_6$) of 1 (as indicated by a directed edge 722 between exposed vulnerability $v_5$ 405 and non-exposed vulnerability $v_6$ 406). FIG. 7B can also include an exposure factor on host $h_4$ 414 of 1, based on non-exposed vulnerability $v_6$ 406 (as indicated by a directed edge 724).

The only difference between FIGS. 8A and 8B is that the FIG. 8B scenario includes an additional component $h_5$ 415 that depends on one of the components ($h_4$ 414) that can be exploited (e.g., by $v_6$ 406 and $v_5$ 405).

If information about the nature of each dependency is not available (i.e., the system does not know the dependency function $f_{h^*}$ which is associated with each component h* in Equation (7)), it can be assumed that the impact propagates to all dependent components proportionally to the exposure factor of the compromised component. In this case, Equation (7) can be rewritten as:

$$avm = \quad (8)$$
$$\sum_{v \in V} \sum_{h \in H \text{ s.t. degrades}(v,h)} \rho^*(v) \cdot ef(v, h) \cdot \left\{ u(h) + \sum_{h^* \in D_\uparrow(h)} u(h^*) \right\}$$

In Equation (8), the loss of utility due to the exploitation of a vulnerability v on a component h can be calculated by multiplying the total utility across h and all its dependent components by the exposure factor ef(v, h). The assumption behind Equation (8) does not limit in any way the generality of the generation 5 metrics. On the contrary, Equation (8) can show that the generation 5 metrics are general enough to adapt to the level of granularity of the available information, while preserving its multi-dimensional nature, which can set the generation 5 metrics apart from existing attack surface metrics.

Generation 4 metrics may also be considered as attack volume metrics, as the generation 4 metrics do go beyond simply considering exposed vulnerabilities and factor in the effect of multi-step attacks. However, the generation 4 metrics cannot account for the propagation of an exploit's impact to otherwise non-vulnerable components, and thus cannot fully consider the depth of potential attacks.

Figure 9:
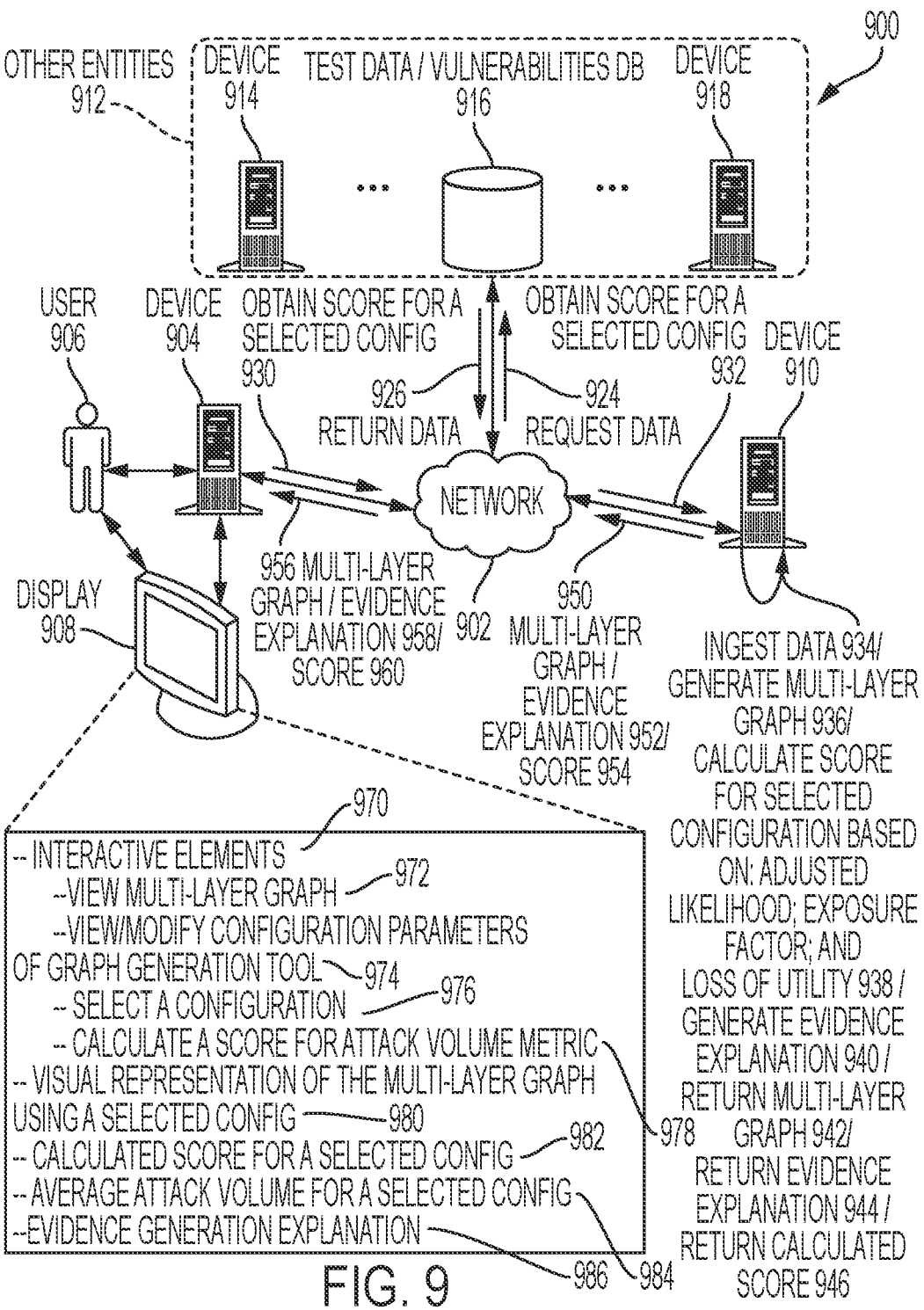
FIG. 9 depicts an exemplary environment for facilitating a ranking score using attack volume to find optimal configurations, in accordance with an embodiment of the present application.

Exemplary Environment for Facilitating a Ranking Score Using Attack Volume to Find Optimal Configurations FIG. 9 depicts an exemplary environment 900 for facilitating a ranking score using attack volume to find optimal configurations, in accordance with an embodiment of the present application. Environment 900 can include: a device 904, an associated user 906, and an associated display 908; other entities 912; and a device 910. Other entities 912 can include a plurality of devices and data stored in the plurality of devices, e.g., devices 914 and 918 (which can include associated storage devices, not shown) and a test data/vulnerability database 916 (e.g., National Vulnerability Database or NVD). Other entities 912 can also include IoT search engines, such as Shodan (not shown) and other public or proprietary databases. Device 904, other entities 912, and device 918 can communicate with each other via a network 902. Vulnerability database 916 can include vulnerabilities which are organized based on a category of vulnerability, and can also include selected known vulnerabilities (not shown). Devices 904 and 910 can be a server, a computing device, or any device which can perform the functions described herein.

During operation, device 904 can receive information obtained from other entities 912 and ingested by device 910 (e.g., by the data ingestion framework or another device or component). Device 910 can determine information sources from which to retrieve data, request the data from the information sources (via a request data 924 communication), and receive the requested data (via a return data 926 communication). Upon receiving the requested data (not shown), device 910 can ingest the data, normalize the ingested data, and extract information from the ingested data (operation 934).

In some embodiments, user 906 can select an interactive element on display 908, which corresponds to a command to generate the multi-layer graph (not shown) or obtain a score for a selected configuration with certain configuration parameters (elements 976 and 978). For example, via element 978, user 906 can send a command to obtain a score for a selected configuration 930. Device 910 can receive this command (as a command to obtain a score for a selected configuration 932). Device 910 can generate the multi-layer graph (operation 936), based on the selected configuration, and can thus determine the multi-layer graph, which can include all the nodes, directed edges, likelihoods, adjusted likelihoods, and exposure factors as described herein.

Specifically, the multi-layer graph can include a configuration subgraph, a vulnerability subgraph, and a dependency subgraph. The vulnerability subgraph can include vulnerability nodes which represent known vulnerabilities to the system. Exposed vulnerability nodes can represent vulnerabilities at a perimeter of the system and non-exposed vulnerability nodes can represent vulnerabilities not at the perimeter of the system. Exposed vulnerability nodes can each be associated with a first likelihood of exploitation and non-exposed vulnerability nodes can each be associated with a second likelihood of exploitation based on a prior likelihood associated with a prior vulnerability node which enables a respective non-exposed vulnerability node.

The dependency subgraph can include dependency nodes which represent components in the system. Direct dependency nodes can each be associated with an exposure factor which indicates an amount of degradation caused to a respective component based on exploitation of a respective vulnerability which directly degrades the respective component. Indirect dependency nodes can each be associated with a respective dependency function which indicates a level of dependency of a respective indirect dependency node upon a dependency node reachable by a directed edge from the respective indirect dependency node to the dependency node.

Device 918 can calculate, across all non-exposed vulnerability nodes and all direct dependency nodes, a score which indicates an attack volume of the system using a metric (e.g., a generation 4 metric) which is based on at least: a respective second likelihood associated with a respective non-exposed vulnerability node; an exposure factor associated with a respective dependency node which represents a component directly degraded based on exploitation of a vulnerability represented by the respective non-exposed vulnerability node; and a loss of utility of the component represented by the respective dependency node (operation 938).

Device 918 can also calculate, across all non-exposed vulnerability nodes, all direct dependency nodes, and all indirect dependency nodes, a score which indicates an attack volume of the system using a metric (e.g., a generation 5 metric) which is based on at least: a respective second likelihood associated with a respective non-exposed vulnerability node; an exposure factor associated with a respective dependency node which represents a component directly degraded based on exploitation of a vulnerability represented by the respective non-exposed vulnerability node; a loss of utility of the component represented by the respective dependency node; and the respective dependency function associated with the respective indirect dependency node (operation 938).

Device 918 can generate an evidence explanation for the calculated score (operation 940) and can return to device 904 any or all of the multi-layer graph, the evidence explanation, and the calculated score (respectively, operations 942, 944, and 946) as a multi-layer graph 950, evidence explanation 952, and a score 954.

Device 904 can receive multi-layer graph 950, evidence explanation 952, and score 954 (as a multi-layer graph 956, evidence explanation 958, and a score 960) and can display on the screen of display 908 at least interactive elements 970 including at least: a view of the multi-layer graph (similar to element 972); the calculated score for a selected configuration (element 982); the average attack volume for a selected configuration (element 984) (which can correspond to the calculated score); and an evidence generation explanation (element 986) (which can include a description of which metric was used to calculate the score).

Using an interactive element on display 908, user 906 can select a configuration (element 976) or modify configuration parameters of the system to obtain an updated configuration (not shown) or modify configuration parameters of the graph generation tool (element 974, as described below in relation to FIG. 11A). User 906 can send another command to obtain another score for the selected or updated configuration (similar to command 930), and the operation can repeat as described above.

Thus, environment 900 depicts how user 906 can interact with the system to view, obtain, and modify configurations based on the calculated score (which is based on the generation 4 or 5 metrics described herein). The system can provide an optimal configuration based on user- or system-configured constraints and parameters. User 906 (or the overall system) can select an optimal configuration which prioritizes at least one of a security priority or an operational priority. In addition, calculation of the score can be based on various configurations, as described below in relation to the four scores depicted in FIG. 11B.

Figure 10A:
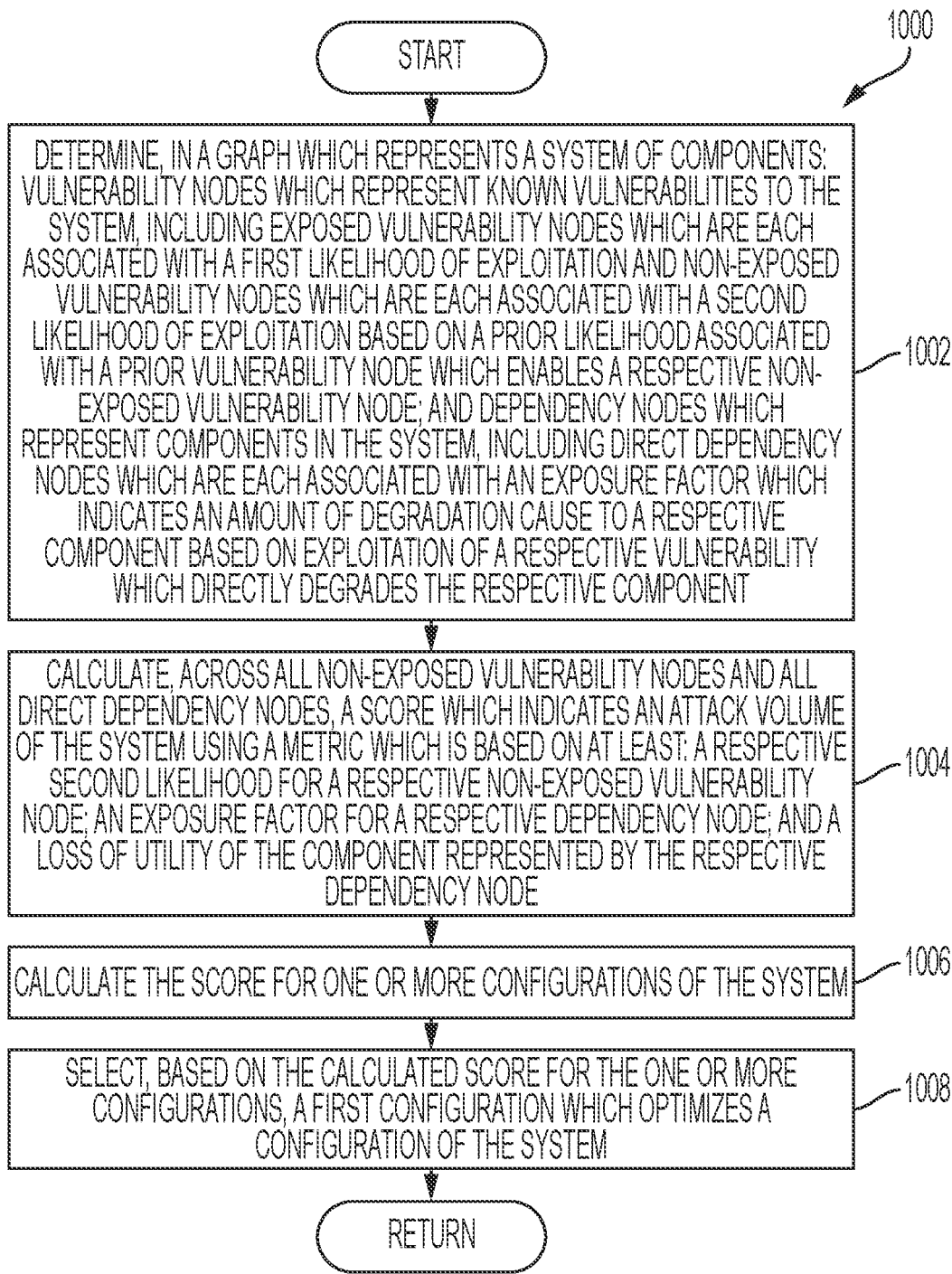
FIG. 10A presents a flowchart illustrating a method for facilitating a ranking score using attack volume to find optimal configurations, in accordance with an embodiment of the present application.

Method for Facilitating a Ranking Score Using Attack Volume to Find Optimal Configurations FIG. 10A presents a flowchart 1000 illustrating a method for facilitating a ranking score using attack volume to find optimal configurations, in accordance with an embodiment of the present application. During operation, the system determines, in a graph which represents a system of components: vulnerability nodes which represent known vulnerabilities to the system (wherein exposed vulnerability nodes represent vulnerabilities at a perimeter of the system and non-exposed vulnerability nodes represent vulnerabilities not at the perimeter of the system, and wherein exposed vulnerability nodes are each associated with a first likelihood of exploitation and non-exposed vulnerability nodes are each associated with a second likelihood of exploitation based on a prior likelihood associated with a prior vulnerability node which enables a respective non-exposed vulnerability node); and dependency nodes which represent components in the system (wherein direct dependency nodes are each associated with an exposure factor which indicates an amount of degradation caused to a respective component based on exploitation of a respective vulnerability which directly degrades the respective component) (operation 1002).

The system calculates, across all non-exposed vulnerability nodes and all direct dependency nodes, a score which indicates an attack volume of the system using a metric which is based on at least: a respective second likelihood associated with a respective (e.g., first) non-exposed vulnerability node; an exposure factor associated with a respective dependency node which represents a component directly degraded based on exploitation of a vulnerability represented by the respective (e.g., the first) non-exposed vulnerability node; and a loss of utility of the component represented by the respective dependency node (operation 1004). The system calculates the score for one or more configurations of the system (operation 1006). The system (or a user of the system) selects, based on the calculated score for the one or more configurations, a first configuration of the one or more configurations which optimizes a configuration of the system (operation 1008).

The system can calculate the score based on a weighted summation of a loss of utility, across all components represented by the direct dependency nodes, caused by an exploitation of any vulnerability which directly or indirectly degrades a respective component, wherein a respective second likelihood associated with a respective non-exposed vulnerability node is used as a weight in the weighted summation. This calculation can be based on the generation 4 metrics described above.

Figure 10B:
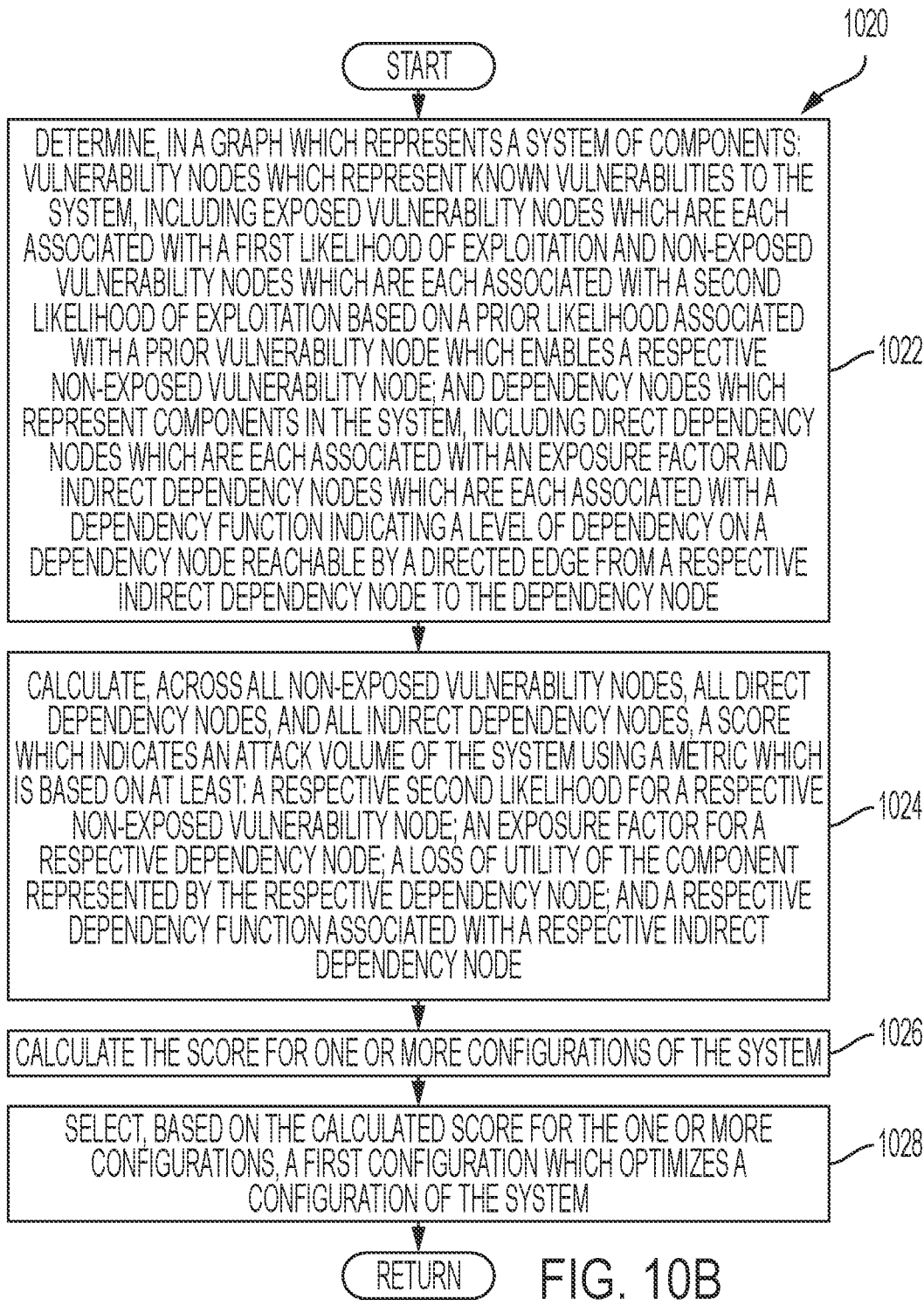
FIG. 10B presents a flowchart illustrating a method for facilitating a ranking score using attack volume to find optimal configurations, in accordance with an embodiment of the present application.

FIG. 10B presents a flowchart 1020 illustrating a method for facilitating a ranking score using attack volume to find optimal configurations, in accordance with an embodiment of the present application. During operation, the system determines, in a graph which represents a system of components: vulnerability nodes which represent known vulnerabilities to the system (wherein exposed vulnerability nodes represent vulnerabilities at a perimeter of the system and non-exposed vulnerability nodes represent vulnerabilities not at the perimeter of the system, and wherein exposed vulnerability nodes are each associated with a first likelihood of exploitation and non-exposed vulnerability nodes are each associated with a second likelihood of exploitation based on a prior likelihood associated with a prior vulnerability node which enables a respective non-exposed vulnerability node); and dependency nodes which represent components in the system (wherein direct dependency nodes are each associated with an exposure factor which indicates an amount of degradation caused to a respective component based on exploitation of a respective vulnerability which directly degrades the respective component and wherein a respective indirect dependency node is associated with a respective dependency function which indicates a level of dependency of the respective indirect dependency node upon a dependency node reachable by a directed edge from the respective indirect dependency node to the dependency node) (operation 1022).

The system calculates, across all non-exposed vulnerability nodes, all direct dependency nodes, and all indirect dependency nodes, a score which indicates an attack volume of the system using a metric which is based on at least: a respective second likelihood associated with a respective (e.g., a first) non-exposed vulnerability node; an exposure factor associated with a respective dependency node which represents a component directly degraded based on exploitation of a vulnerability represented by the respective (e.g., the first) non-exposed vulnerability node; a loss of utility of the component represented by the respective dependency node; and the respective dependency function associated with the respective indirect dependency node (operation 1024). The system calculates the score for one or more configurations of the system (operation 1026). The system (or a user of the system) selects, based on the calculated score for the one or more configurations, a first configuration of the one or more configurations which optimizes a configuration of the system (operation 1028).

The system can calculate the score based on a set of components which depend upon a respective component represented by a respective direct dependency node based on a chain of directed edges. This calculation can be based on the generation 5 metrics described above.

Concrete Results Depicting Exemplary Scores on Various Testbeds

The concrete results described herein can be based on synthetic data generated by a graph generation tool and real data, e.g., testbed data which models distributed systems such as train control system and satellite control systems. FIG. 11A depicts a table 1100 indicating configurable parameters of a graph generation tool, in accordance with an embodiment of the present application. Table 1100 can include rows 1110-1126 with a name 1102 and a description 1104. The graph generation tool can generate NUM_COMPONENTS 1110 components, each having a random number of vulnerabilities between MIN_NUM_VULNS_PER_COMP 1111 and MAX_NUM_VULNS_PER_COMP 1112. The vulnerabilities generated at this stage may be considered external vulnerabilities that are potentially exposed to external attackers. The flag GENERATE_VULN_PATH 1126 can control whether vulnerability paths should be generated. If it is set to TRUE, with probability PROB_INT_VULN 1113 each external vulnerability can be converted into an internal vulnerability with a random number of enabling vulnerabilities between MIN_NUM_VULNS_PER_VULN 1114 and MAX_NUM_VULNS_PER_VULN 1115. With a probability PROB_LOGIC_AND 1122, an internal vulnerability can be defined as being enabled by the conjunction of its enabling vulnerabilities.

Each vulnerability can be assigned an exploitation likelihood randomly picked between MIN_EXPLOITATION_LIKELIHOOD 1120 and MAX_EXPLOITATION_LIKELIHOOD 1121 and an exposure factor randomly picked between MIN_EXPOSURE_FACTOR 1118 and MAX_EXPOSURE_FACTOR 1119. For each of the NUM_COMPONENTS 1110 components, a number of non-vulnerable dependent components between MIN_NUM_DEP_COMP 1116 and MAX_NUM_DEP_COMP 1117 can be generated. This step can be avoided by setting both MIN_NUM_DEP_COMP 1116 and MAX_NUM_DEP_COMP 1117 to a value of "0." The flag ALLOW_DEPENDENCIES 1124 can control whether dependencies between the NUM_COMPONENTS 1110 vulnerable components should be generated, and the flag ALLOW_DEPENDENCY_LOOPS 1125 can control whether cyclic dependencies should be allowed.

Finally, each external vulnerability can be associated with a constraint, which is relaxed with a probability PROB_CONSTR_RELAX 1123. A relaxed constraint can enable the corresponding vulnerability.

Using the four frameworks of the overall system described above, four types of scores can be defined. Each of the four scores can be the result of calculating the attack volume for a given system configuration. A first score can be referred to as the Operational Constraint Score (OCS) and can measure the attack volume induced by the elimination of all infeasible security constraints, i.e., constraints that contradict operational requirements. This first score (OCS) can define a lower bound on the attack.

A second score can be referred to as the Current Configuration Score (CCS) and can measure the attack volume of the current configuration of the testbed. The second score (CCS) can include the induced security cost contributions from the infeasible security constraints and the current value constraints. The second score (CCS) can reflect the security cost of keeping the testbed operational while considering the current value setting. For example, for the current value setting, if a current value is not feasible against the set of non-relaxable constraints, the value of the parameter may be considered invalid, thus enabling all vulnerabilities associated with it. If a current value is feasible, all conflicting relaxable constraints can be found and relaxed.

A third score can be referred to as the SCIBORG Analysis Score (SAC) and can measure the attack volume induced by the configuration recommended as a result of the overall system analysis.

A fourth score can be referred to as the Worst Case Score (WCS) and can measure the attack volume resulting from relaxing all the testbed constraints. This fourth score (WCS) can define an upper bound on the attack volume that will result from the overall system analysis.

FIG. 11B depicts a table 1130 indicating scores 1141, 1142, 1143, and 1144 based on various testbeds 1132, 1134, 1146, and 1138, in accordance with an embodiment of the present application. Testbed 132 (SAFETrains) models a railway engine, a wayside radio bungalow, and back-end servers, and can consist of 9 Ubuntu servers, a Palo Alto firewall, a Vyos firewall, a Cisco CSR router, a Cisco WLC access point, a FreeNAS, a LinksysWiFi extender, and a Laird CL4490 RS232 radio. Testbed 132 can have 630 components, 1,359 parameters, 659 constraints, and 15,161 vulnerabilities. Testbed 1134 (VSAT-SPOKE) is a notional virtual satellite (vsat) roughly corresponding to a cubeSAT with nine subsystems connected to a central arbiter via point-to-point buses. The nine subsystems represent common satellite systems, such as communications, power, propulsion, attitude control, and the payload. Testbed 1134 can include 37 components, 108 parameters, 116 constraints, and 64 vulnerabilities. Testbed 1136 (VSAT-RING) is another virtual satellite with nine subsystems: seven are connected via a ring and two are terminal branches off the ring. The subsystems models in testbed 1136 can be significantly different than those in testbed 1134. Testbed 136 can include 18 components, 99 parameters, 1,391 constraints, and 1,121 vulnerabilities. Testbed 1138 (UnitTests) can be used to validate several component, parameter, constraint, and vulnerability graph topologies. Testbed 1138 can include 4 components, 4 parameters, 5 constraints, and 3 vulnerabilities.

Table 1130 depicts the results of each of the four calculated or computed test scores against each of the four testbeds. The attack volumes measured by each score for a given testbed can indicate the following relationship between the four scores:

$$OCS \leq SAC \leq CCS \leq WCS.$$

The system can calculate the four scores as part of the reasoning framework, in elimination and reasoning rounds, where a round is defined as the Satisfiability Module Theories (SMT) analysis of a subset of parameters and associated constraints. The reasoning framework may perform several rounds of analysis in order to find a feasible set of values for a subset of parameters, where the SMT solver can evaluate each constraint associated with the subset and subject for relaxation. During the elimination round, the solver can evaluate the feasibility of the model constraints on the subsets of parameters. Before beginning the reasoning rounds, the system can eliminate from the model the constraints that are targets for relaxation and not feasible in finding a satisfiable model solution. The system can analyze these constraints against functional requirement constraints or constraints that are not subject for relaxation. The result of the elimination round can be a list of security and current value constraints that are targets for relaxation. The system can compute the OCS score by relaxing these constraints in the model graph and computing the attack volume of the graph.

Once the infeasible constraints have been eliminated, the reasoning round can continue analyzing the subsets of parameters and associated constraints, looking for a feasible configuration of parameter assignments. When a subset of constraints, which are a target for relaxation, results in conflicts to produce a satisfiable model of parameter assignments, the reasoner can select the constraint with the minimum security impact score and relaxes that selected constraint. The reasoner can continue its analysis until it finds a satisfiable SMT model. The result of the relaxation round can be a list of security and current value constraints that are targets for relaxation. These constraints can be used to compute the relaxation score (RS) by relaxing the constraints in the model graph and computing the attack volume of the graph.

The system can compute the CCS by executing a current value constraint (CVC) elimination round. During the CVC elimination round, the system can evaluate the feasibility of the model constraints on the current value of the model parameters. The system can select for relaxation the constraints that are targets for relaxation and that are not feasible in finding a satisfiable model solution given the parameter current values. The result of the CVC elimination round can be a list of security constraints that are targets for relaxation. The system can compute the current value score (CVS) by relaxing these constraints in the model graph and computing the attack volume of the graph. The system can compute the CCS score as the aggregation of the OCS and CVS scores without counting twice the constraints that may occur in the computation of these scores.

The system can compute the WCS by relaxing in the model graph all the model constraints that are subject for relaxation and can also compute the attack volume of the graph. Each time that the system calculates or computes a score on the model graph, the system can reset the constraint nodes to avoid duplication of nodes in the different score computations.

Detailed functionality of the reasoner or the reasoning framework, including the elimination and reasoning rounds, is described in U.S. patent Ser. No. 16/923,763.

Concrete Results Depicting Improvement Based on Generation 5 Metrics; Scalability The concrete results described herein further demonstrate how the generation 4 and 5 metrics can discriminate between pairs of configurations that only differ with respect to one feature. For generation 4 metrics, this one feature can include the impact of exploiting additional vulnerabilities (represented by non-exposed vulnerability nodes in the vulnerability subgraph) after exploitation of any exposed vulnerabilities, as described above in relation to FIGS. 7A and 7B. For generation 5 metrics, this one feature can include the impact of additional information about dependencies (represented by indirect dependency nodes which depend on direct dependency nodes or other indirect dependency nodes), as described above in relation to FIGS. 8A and 8B.

The concrete results of FIGS. 11C and 11D can be based on repeating the following five steps for each of the five generations of metrics described herein:

1) Generate a set of n graphs using a baseline configuration (e.g., number of components, number of vulnerabilities per component). These graphs can represent Scenario A.
2) Modify the baseline configuration to generate graphs that differ from the previous set with respect to the one feature that metrics in the current generation can discriminate, but metrics in the previous generation cannot discriminate. Modify the baseline configuration in a way that can be expected to increase the attack volume.
3) Generate the second set of n graphs using the modified configuration. These graphs can represent Scenario B.
4) For each set of graphs, compute the average value of the attack volume.
5) Verify that the average attack volume for the second set of graphs is larger than the average attack volume for the first set of graphs.

The two sets of graphs can be generated using n=3, such that all results shown in FIG. 11D can be averaged over three graphs with the same characteristics.

FIG. 11C depicts a table 1150 indicating a baseline configuration for a first scenario using generation 1 metrics, in accordance with an embodiment of the present application. Table 1150 can include rows 1160-1173 which each include a name 1152 and a description 1154. FIG. 11D depicts a table 1180 indicating the effectiveness of using the metrics from generations 1-5 in discrimination between pairs of configurations, in accordance with an embodiment of the present application. Table 1180 can include rows 1190-1194, which correspond, respectively, to generations 1-5 metrics. Table 1180 can also include the average attack volume for Scenario A (column 1182) and for Scenario B (column 1184).

For the generation 1 metrics, the graphs for Scenario A can be generated using the baseline configuration described in table 1150. Parameters which are not shown in this table are not applicable to this scenario. To generate the graphs for Scenario B, this baseline configuration can be modified to increase the number of vulnerabilities per component from 10 to 15, by setting MIN_NUM_VULNS_PER_COMP=MAX_NUM_VULNS_PER_COMP=15. Generation 1 metrics can discriminate between configurations with different numbers of exposed vulnerabilities, and would return a higher score for Scenario B graphs. Indeed, as shown in row 1190, the attack volume metric does return a higher average value for Scenario B graphs (140) than for Scenario A graphs (100).

For the generation 2 metrics, the graphs for Scenario A can be generated using the same baseline configuration described in table 1150, but with MIN_EXPLOITATION_LIKELIHOOD=0.3 and MAX_EXPLOITATION_LIKELIHOOD=0.6. To generate the graphs for Scenario B, this configuration can be modified to increase the average exploitation likelihood of vulnerabilities by setting MIN_EXPLOITATION_LIKELIHOOD=0.6 and MAX_EXPLOITATION_LIKELIHOOD=0.9. Generation 2 metrics can discriminate between configurations with the same number of exposed vulnerabilities but different exploitation likelihoods, and would return a higher score for Scenario B graphs. Indeed, as shown in row 1191, the attack volume metric does return a higher average value for Scenario B graphs (373) than for Scenario A graphs (225).

For the generation 3 metrics, the graphs for Scenario A can be generated using the same configuration used for Scenario B of generation 2, but with MIN_EXPOSURE_FACTOR=0.3 and MAX_EXPOSURE_FACTOR=0.6. To generate the graphs for Scenario B, this configuration can be modified to increase the average exposure factor by setting MIN_EXPOSURE_FACTOR=0.6 and MAX_EXPOSURE_FACTOR=0.9. Generation 3 metrics can discriminate between configurations with the same number of exposed vulnerabilities and same exploitation likelihoods but different exposure factors, and would return a higher score for Scenario B graphs. Indeed, as shown in row 1192, the attack volume metric does return a higher average value for Scenario B graphs (1,405) than for Scenario A graphs (844).

For the generation 4 metrics, the graphs for Scenario A can be generated using the same configuration used for Scenario B of generation 3. To generate the graphs for Scenario B, this configuration can be modified to allow multi-step attack paths by setting GENERATE_VULN_PATH=TRUE, MIN_NUM_VULN_PER_VULN=4, and MAX_NUM_VULN_PER_VULN=4. Generation 4 metrics can discriminate between configurations that only differ for the absence or presence of multi-step attack paths, and would return a higher score for Scenario B graphs. Indeed, as shown in row 1193, the attack volume metric does return a higher average value for Scenario B graphs (5,218) than for Scenario A graphs (1,405).

For the generation 5 metrics, the graphs for Scenario A can be generated using the same configuration used for Scenario B of generation 4. To generate the graphs for Scenario B, this configuration can be modified to allow dependencies by setting ALLOW_DEPENDENCIES=TRUE. Generation 5 metrics can discriminate between configurations that only differ in considering or not considering dependencies among components, and would return a higher score for Scenario B graphs. Indeed, as shown in row 1194, the attack volume metric does return a higher average value for Scenario B graphs (31,602) than for Scenario A graphs (5,218).

Other concrete results can include generating synthetic graphs of various sizes. In a first experiment, the system can vary the number of components between 100 and 1,000 and the number of vulnerabilities per component between 2 and 8, while every parameter can remain constant through the first experiment. In a second experiment, the system can again vary the number of components between 100 and 1,000 but can also vary both the number of vulnerabilities per component and the number of enabling vulnerabilities per internal vulnerability between 2 and 8. In the first and second experiments, the system can measure the average time required to compute the attack volume metric for each combination of the variable parameters.

The results of the first and second experiment can indicate that, for a given value of the number of vulnerabilities per component, the computation time can grow linearly with the number of components, for the graph sizes considered. Thus, as described herein, while the time complexity of computing the metric may be quadratic, in practice, the system can achieve a less-than-quadratic time complexity.

Integration into a Practical Application and Improvements to Technologies

The embodiments described herein can be integrated into a practical application for, and can result in an improvement in, several technologies and technical fields, including but not limited to cybersystem security, protection and configuration of distributed systems, optimization of system configurations, defense against potential security attacks, and quantification of an attack surface or volume.

Users of the system described herein can include an individual with a smartphone, a mobile device, or a computing terminal (e.g., user 906 of environment 900 of FIG. 9). Users of the system can also include any client in a cybersystem security setting, where determining and optimizing the configuration of a system against attacks can provide a more secure system. The technological improvements described herein (e.g., relating to the generation 4 and 5 metrics) provide a system which can discriminate between systems based on the impact of exploiting additional non-exposed vulnerabilities and information about dependencies among components. These technological improvements can thus account for cascading failures due to the interdependencies among vulnerabilities, components, and configurations. For example, the tables described above in relation to FIGS. 11C and 11D support the technological improvements of the described embodiments because the tables indicate results which demonstrate that the generation 4 and 5 metrics can clearly and significantly discriminate between scenarios which differ based on the elements or features described herein.

Furthermore, the described embodiments provide an improvement to technology because the system allows a user to interact with the calculated scores and corresponding configurations (as shown in the exemplary information displayed in display 908 of FIG. 9). The system can result in facilitating the use of the calculated ranking score by using the attack volume metric as described herein and relating to both generations 4 and 5 to determine the attack volume of a distributed system, which can result in finding optimal configurations of the distributed system.

Exemplary Computer and Communication System

Figure 12:
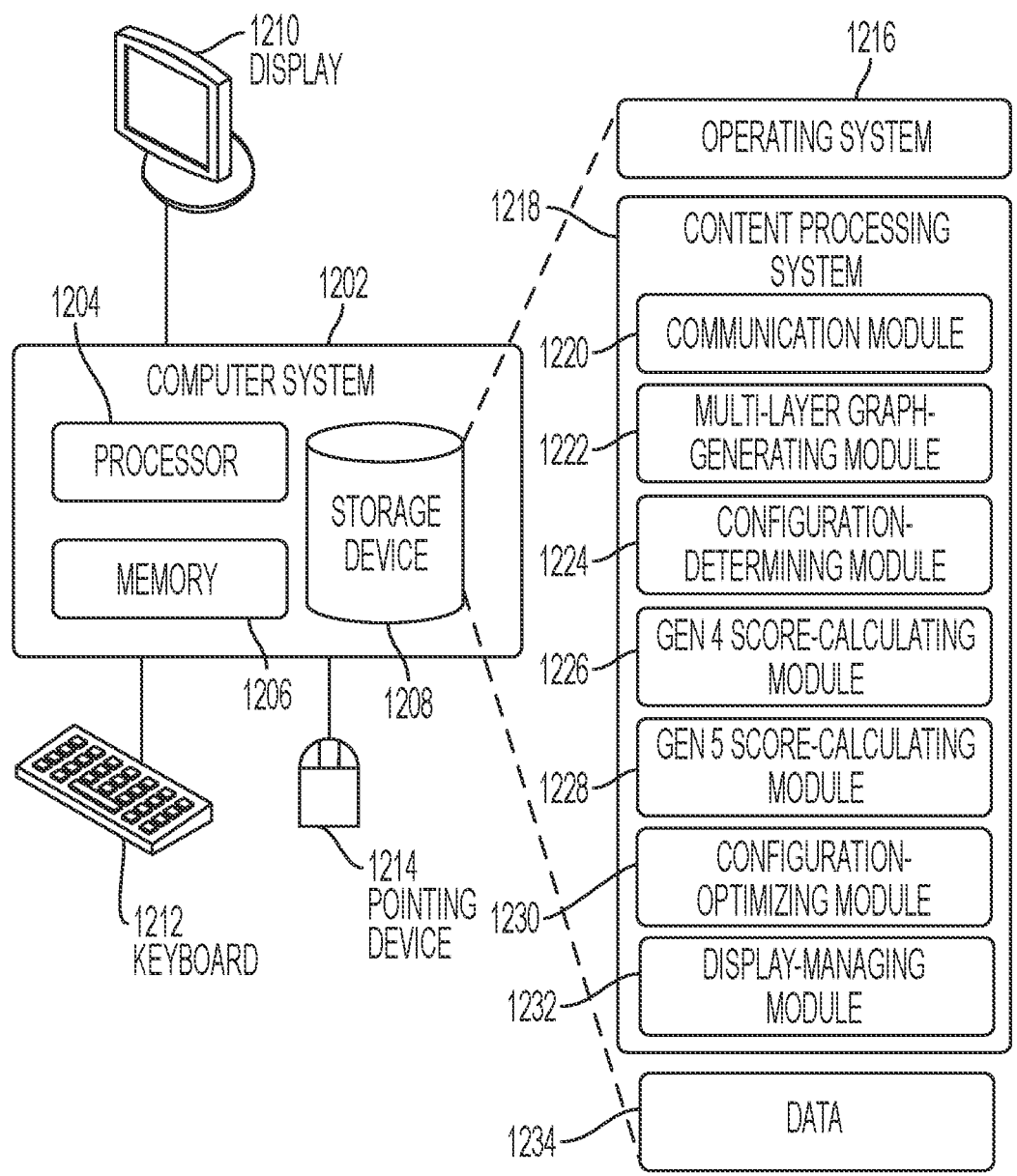
FIG. 12 presents an exemplary computer and communication system which facilitates a ranking score using attack volume to find optimal configurations, in accordance with an embodiment of the present application.

FIG. 12 presents an exemplary computer and communication system 1202 which facilitates a ranking score using attack volume to find optimal configurations, in accordance with an embodiment of the present application. Computer system 1202 includes a processor 1204, a memory 1206, and a storage device 1208. Memory 1206 can include a volatile memory (e.g., RAM) that serves as a managed memory, and can be used to store one or more memory pools. Furthermore, computer system 1202 can be coupled to a display device 1210, a keyboard 1212, and a pointing device 1214. Storage device 1208 can store an operating system 1216, a content-processing system 1218, and data 1234.

Content-processing system 1218 can include instructions, which when executed by computer system 1202, can cause computer system 1202 to perform methods and/or processes described in this disclosure. Specifically, content-processing system 1218 may include instructions for sending and/or receiving data packets to/from other network nodes across a computer network (communication module 1220). A data packet can include data, a request, a command, a score, a configuration, and graph-related information.

Content-processing system 1218 can further include instructions for determining a multi-layer graph with three subgraphs, which each include the nodes and directed edges as described herein (multi-layer graph-generating module 1222). Content-processing system 1218 can include instructions for determining a configuration of a distributed system and using the configuration to generate the multi-layer graph (configuration-determining module 1224). Content-processing system 1218 can also include instructions for calculating, across all non-exposed vulnerability nodes and all direct dependency nodes, a score which indicates an attack volume of the system using a metric (e.g., generation 4) which is based on at least: a respective second likelihood associated with a respective non-exposed vulnerability node; an exposure factor associated with a respective dependency node which represents a component directly degraded based on exploitation of a vulnerability represented by the respective non-exposed vulnerability node; and a loss of utility of the component represented by the respective dependency node (generation 4 score-calculating module 1226).

Content-processing system 1218 can further include instructions for calculating, across all non-exposed vulnerability nodes, all direct dependency nodes, and all indirect dependency nodes, a score which indicates an attack volume of the system using a metric (e.g., generation 5) which is further based on the respective dependency function associated with the respective indirect dependency node (generation 5 score-calculating module 1228).

Content-processing system 1218 can additionally include instructions for selecting, based on the calculated score for the one or more configurations, a first configuration of the one or more configurations which optimizes a configuration of the system (configuration-optimizing module 1230). Content-processing system 1218 can include instructions for displaying one or more interactive elements which allow the user to perform the functions described herein, e.g., in relation to display 908 of FIG. 9 (display-managing module 1232).

Data 1234 can include any data that is required as input or that is generated as output by the methods and/or processes described in this disclosure. Specifically, data 1234 can store at least: a graph; a multi-layer graph; subgraphs; a configuration subgraph; a vulnerability or attack subgraph; a dependency subgraph; nodes; vertices; directed edges; vulnerability nodes; dependency nodes; configuration nodes; a likelihood; an exploitation likelihood; an adjusted likelihood; an exposure factor; a summation; a weight; a weighted summation; a set of actions; a priority for a set of actions; a security posture; a score; an Operational Constraint Score (OCS); a SCIBORG Analysis Score (SAC); a Current Configuration Score (CCS); a Worst Case Score (WCS); a configuration; a current configuration; a baseline configuration; a scenario; information used by a graph generation tool, an artificial intelligence search, or a dynamic programming tool; and an average attack volume.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed.

When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method, comprising:
   determining, in a graph which represents a system of components:
      vulnerability nodes which represent known vulnerabilities to the system, wherein exposed vulnerability nodes represent vulnerabilities at a perimeter of the system and non-exposed vulnerability nodes represent vulnerabilities not at the perimeter of the system, and
      wherein the exposed vulnerability nodes are each associated with a first likelihood of exploitation and the non-exposed vulnerability nodes are each associated with a second likelihood of exploitation based on a prior likelihood associated with a prior vulnerability node which enables a respective non-exposed vulnerability node; and
      dependency nodes which represent the components in the system,
      wherein direct dependency nodes are each associated with an exposure factor which indicates an amount of degradation caused to a respective component based on exploitation of a respective vulnerability which directly degrades the respective component;
   calculating, across all the non-exposed vulnerability nodes and all the direct dependency nodes, a score which indicates an attack volume of the system using a metric which is based on at least:
      a respective second likelihood associated with a first non-exposed vulnerability node;
      an exposure factor associated with a respective dependency node which represents a component directly degraded based on exploitation of a vulnerability represented by the first non-exposed vulnerability node; and
      a loss of utility of the component represented by the respective dependency node,
   wherein the score is calculated for one or more configurations of the system of components; and
   selecting, based on the calculated score for the one or more configurations of the system of components, a first configuration of the one or more configurations of the system of components which optimizes a configuration of the system.

2. The method of claim 1,
   wherein the graph comprises a multi-layer graph which includes a configuration subgraph, a vulnerability subgraph, and a dependency subgraph,
   wherein the vulnerability subgraph includes the vulnerability nodes, which include the exposed vulnerability nodes and the non-exposed vulnerability nodes, and
   wherein a directed edge from an exposed vulnerability node or a first non-exposed vulnerability node to a second non-exposed vulnerability node is associated with the second likelihood.

3. The method of claim 2, wherein calculating the score using the metric is further based on:
   a weighted summation of a loss of utility, across all the components represented by the direct dependency nodes, caused by an exploitation of any vulnerability which directly or indirectly degrades a respective component,
   wherein a respective second likelihood associated with a respective non-exposed vulnerability node is used as a weight in the weighted summation.

4. The method of claim 2,
   wherein the dependency graph includes the dependency nodes, which include the direct dependency nodes and indirect dependency nodes, and
   wherein a respective indirect dependency node is associated with a respective dependency function which indicates a level of dependency of the respective indirect dependency node upon a dependency node reachable by a directed edge from the respective indirect dependency node to the dependency node.

5. The method of claim 4,
   wherein calculating the score is performed across all the non-exposed vulnerability nodes, all the direct dependency nodes, and all the indirect dependency nodes using the metric and is further based on:
   the respective dependency function associated with the respective indirect dependency node.

6. The method of claim 5, wherein calculating the score using the metric is further based on:
   a set of components which depend upon a respective component represented by the respective direct dependency node based on a chain of directed edges.

7. The method of claim 5, further comprising:
   applying a second configuration for the system based on the calculated score for the second configuration using the metric,
   wherein the second configuration prioritizes a set of actions based on the calculated score for the second configuration.

8. The method of claim 5, further comprising:
   applying, based on the calculated score for the one or more configurations of the system of components using the metric, an artificial intelligence search or a dynamic programming tool to obtain a third configuration which has an improved security posture over at least one of the one or more configurations of the system of components.

9. The method of claim 5, further comprising:
   displaying, on a screen of a user device, one or more interactive elements which allow the user to:
      view the multi-layer graph, including the vulnerability nodes, the dependency nodes, directed edges, the first and second likelihoods of exploitation associated with the exposed and non-exposed vulnerability nodes, exposure factors, and dependency functions in any of the configuration subgraph, the vulnerability subgraph, and the dependency subgraph;
      view or modify configuration parameters for the system using a graph generation tool to obtain the one or more configurations of the system of components;
      calculate the score using the metric for the one or more configurations of the system of components;
      view the calculated score for the one or more configurations of the system of components;
      select a first configuration of the one or more configurations of the system of components;

view an average attack volume for the selected first configuration; and
view an explanation of evidence associated with the selected configuration.

10. The method of claim 1, wherein the first likelihood of exploitation and the second likelihood of exploitation are associated with a Common Vulnerability Scoring System exploitability score.

11. The method of claim 1, wherein the score is at least one of:
a first score calculated based on eliminating security constraints which contradict operational requirements, wherein the first score defines a lower bound on the attack volume;
a second score calculated based on maintaining operation of a testbed while considering settings of current values,
wherein when a current value is not feasible against a set of non-relaxable constraints, the current value is invalidated, which enables a set of vulnerabilities associated with the current value, and
wherein when the current value is feasible against the set of non-relaxable constraints, the system relaxes all conflicting relaxable constraints;
a third score calculated based on a recommended configuration; and
a fourth score calculated based on relaxing all constraints of the testbed, wherein the fourth score defines an upper bound on the attack volume.

12. The method of claim 1, wherein selecting the first configuration which optimizes the configuration of the system is based on at least one of a security priority and an operational priority.

13. A computer system comprising:
a processor; and
a storage device storing instructions that when executed by the processor cause the processor to perform a method, the method comprising:
determining, in a graph which represents a system of components:
vulnerability nodes which represent known vulnerabilities to the system, wherein exposed vulnerability nodes represent vulnerabilities at a perimeter of the system and non-exposed vulnerability nodes represent vulnerabilities not at the perimeter of the system, and
wherein the exposed vulnerability nodes are each associated with a first likelihood of exploitation and the non-exposed vulnerability nodes are each associated with a second likelihood of exploitation based on a prior likelihood associated with a prior vulnerability node which enables a respective non-exposed vulnerability node; and
dependency nodes which represent the components in the system,
wherein direct dependency nodes are each associated with an exposure factor which indicates an amount of degradation caused to a respective component based on exploitation of a respective vulnerability which directly degrades the respective component;
calculating, across all the non-exposed vulnerability nodes and all the direct dependency nodes, a score which indicates an attack volume of the system using a metric which is based on at least:
a respective second likelihood associated with a first non-exposed vulnerability node;
an exposure factor associated with a respective dependency node which represents a component directly degraded based on exploitation of a vulnerability represented by the first non-exposed vulnerability node; and
a loss of utility of the component represented by the respective dependency node,
wherein the score is calculated for one or more configurations of the system of components; and
selecting, based on the calculated score for the one or more configurations of the system of components, a first configuration of the one or more configurations of the system of components which optimizes a configuration of the system.

14. The computer system of claim 13, wherein the graph comprises a multi-layer graph which includes a configuration subgraph, a vulnerability subgraph, and a dependency subgraph,
wherein the vulnerability subgraph includes the vulnerability nodes, which include the exposed vulnerability nodes and the non-exposed vulnerability nodes, and
wherein a directed edge from an exposed vulnerability node or a first non-exposed vulnerability node to a second non-exposed vulnerability node is associated with the second likelihood.

15. The computer system of claim 14, wherein calculating the score using the metric is further based on:
a weighted summation of a loss of utility, across all the components represented by the direct dependency nodes, caused by an exploitation of any vulnerability which directly or indirectly degrades a respective component,
wherein a respective second likelihood associated with a respective non-exposed vulnerability node is used as a weight in the weighted summation.

16. The computer system of claim 14, wherein the dependency graph includes the dependency nodes, which include the direct dependency nodes and indirect dependency nodes, and
wherein a respective indirect dependency node is associated with a respective dependency function which indicates a level of dependency of the respective indirect dependency node upon a dependency node reachable by a directed edge from the respective indirect dependency node to the dependency node, and
wherein calculating the score is performed across all the non-exposed vulnerability nodes, all the direct dependency nodes, and all the indirect dependency nodes using the metric and is further based on the respective dependency function associated with the respective indirect dependency node.

17. The computer system of claim 16, wherein calculating the score using the metric is further based on:
a set of components which depend upon a respective component represented by the respective direct dependency node based on a chain of directed edges.

18. The computer system of claim 16, wherein the method further comprises:
displaying, on a screen of a user device, one or more interactive elements which allow the user to:
view the multi-layer graph, including the vulnerability nodes, the dependency nodes, directed edges, the first and second likelihoods of exploitation associated with the exposed and non-exposed vulnerability nodes, exposure factors, and dependency functions in any of the configuration subgraph, the vulnerability subgraph, and the dependency subgraph;

view or modify configuration parameters for the system using a graph generation tool to obtain the one or more configurations of the system of components;

calculate the score using the metric for the one or more configurations of the system of components;

view the calculated score for the one or more configurations of the system of components;

select a first configuration of the one or more configurations of the system of components;

view an average attack volume for the selected first configuration; and view an explanation of evidence associated with the selected configuration.

19. A non-transitory computer-readable storage medium storing instructions that when executed by a computer cause the computer to perform a method, the method comprising:

determining, in a graph which represents a system of components:

vulnerability nodes which represent known vulnerabilities to the system, wherein exposed vulnerability nodes represent vulnerabilities at a perimeter of the system and non-exposed vulnerability nodes represent vulnerabilities not at the perimeter of the system, and wherein the exposed vulnerability nodes are each associated with a first likelihood of exploitation and the non-exposed vulnerability nodes are each associated with a second likelihood of exploitation based on a prior likelihood associated with a prior vulnerability node which enables a respective non-exposed vulnerability node; and dependency nodes which represent the components in the system, wherein direct dependency nodes are each associated with an exposure factor which indicates an amount of degradation caused to a respective component based on exploitation of a respective vulnerability which directly degrades the respective component, and wherein indirect dependency nodes are each associated with a respective dependency function which indicates a level of dependency of a respective indirect dependency node upon a dependency node;

calculating, across all the non-exposed vulnerability nodes, all the direct dependency nodes, and all the indirect dependency nodes, a score for one or more configurations of the system of components, wherein the score indicates an attack volume of the system using a metric which is based on at least:

a respective second likelihood associated with a first non-exposed vulnerability node;

an exposure factor associated with a respective dependency node which represents a component directly degraded based on exploitation of a vulnerability represented by the first non-exposed vulnerability node;

a loss of utility of the component represented by the respective dependency node; and a respective dependency function associated with a respective indirect dependency node; and selecting, based on the calculated score for the one or more configurations of the system of components, a first configuration of the one or more configurations of the system of components which optimizes a configuration of the system.

20. The non-transitory computer-readable storage medium of claim 19, wherein the method further comprises:

applying, based on the calculated score for the one or more configurations of the system of components using the metric, an artificial intelligence search or a dynamic programming tool to obtain a third configuration which has an improved security posture over at least one of the one or more configurations of the system of components.

* * * * *